United States Patent
Sasa et al.

(10) Patent No.: US 11,106,106 B2
(45) Date of Patent: Aug. 31, 2021

(54) ELECTROCHROMIC DEVICE, ELECTRONIC DIMMING EYEGLASSES, AUGMENTED REALITY EYEGLASSES, AND CAMERA

(71) Applicants: Noboru Sasa, Kanagawa (JP); Keiichiroh Yutani, Kanagawa (JP); Tohru Yashiro, Kanagawa (JP); Tomoo Fukuda, Tokyo (JP); Masato Shinoda, Kanagawa (JP); Fuminari Kaneko, Kanagawa (JP)

(72) Inventors: Noboru Sasa, Kanagawa (JP); Keiichiroh Yutani, Kanagawa (JP); Tohru Yashiro, Kanagawa (JP); Tomoo Fukuda, Tokyo (JP); Masato Shinoda, Kanagawa (JP); Fuminari Kaneko, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 297 days.

(21) Appl. No.: 16/355,755

(22) Filed: Mar. 17, 2019

(65) Prior Publication Data
US 2019/0285960 A1    Sep. 19, 2019

(30) Foreign Application Priority Data
Mar. 19, 2018 (JP) .............................. JP2018-051818

(51) Int. Cl.
*G02F 1/163* (2006.01)
*G02F 1/1503* (2019.01)
(Continued)

(52) U.S. Cl.
CPC .............. *G02F 1/163* (2013.01); *G02C 7/101* (2013.01); *G02F 1/1503* (2019.01); *G02F 1/1533* (2013.01); *G03B 11/00* (2013.01)

(58) Field of Classification Search
CPC ...... G02F 1/163; G02F 1/1503; G02F 1/1533; G03B 11/00; G02C 7/101
(Continued)

(56) References Cited

U.S. PATENT DOCUMENTS

2006/0203535 A1* 9/2006 Ishii ....................... G03B 17/00
                                                       365/151
2011/0279884 A1   11/2011 Fujimura et al.
(Continued)

FOREIGN PATENT DOCUMENTS

| JP | 58-090695 | 5/1983 |
| JP | 58-107595 | 6/1983 |

(Continued)

*Primary Examiner* — Mohammed A Hasan
(74) *Attorney, Agent, or Firm* — Xsensus LLP

(57) ABSTRACT

An electrochromic device reversibly and controllably colored and decolored by electricity is provided. The electrochromic device is configured to control at least one of the following functions f1 and f2 based on at least one of an operating environment temperature of the electrochromic device, a continuous elapsed time of a colored state or a decolored state, and an illuminance around the electrochromic device:
  a function f1 of transiting to a colored state and/or limiting transition to a decolored state; and
  a function f2 of transiting to a decolored state and/or limiting transition to a colored state.

20 Claims, 5 Drawing Sheets

(51) Int. Cl.
*G03B 11/00* (2021.01)
*G02C 7/10* (2006.01)
*G02F 1/153* (2006.01)

(58) Field of Classification Search
USPC .......................................................... 359/275
See application file for complete search history.

(56) References Cited

U.S. PATENT DOCUMENTS

| | | |
|---|---|---|
| 2015/0168796 A1 | 6/2015 | Yashiro et al. |
| 2015/0198857 A1 | 7/2015 | Yashiro et al. |
| 2016/0306251 A1* | 10/2016 | Yamamoto ........... G09G 3/2014 |
| 2017/0010514 A1 | 1/2017 | Yashiro et al. |
| 2017/0176833 A1* | 6/2017 | Goto ........................ G02F 1/155 |
| 2017/0235203 A1 | 8/2017 | Yamamoto et al. |
| 2017/0329197 A1 | 11/2017 | Yashiro et al. |
| 2017/0329198 A1 | 11/2017 | Matsuoka et al. |
| 2017/0329199 A1 | 11/2017 | Yashiro et al. |
| 2018/0044581 A1 | 2/2018 | Sagisaka et al. |
| 2018/0208834 A1 | 7/2018 | Goto et al. |

FOREIGN PATENT DOCUMENTS

| | | |
|---|---|---|
| JP | 62-156172 | 7/1987 |
| JP | 62-290768 | 12/1987 |
| JP | 64-057241 | 3/1989 |
| JP | 3-006534 | 1/1991 |
| JP | 2007-171781 | 7/2007 |
| JP | 2008-116718 | 5/2008 |
| JP | 2015-014743 | 1/2015 |
| JP | 2016-218359 | 12/2016 |
| WO | WO98/035267 A1 | 8/1998 |

\* cited by examiner

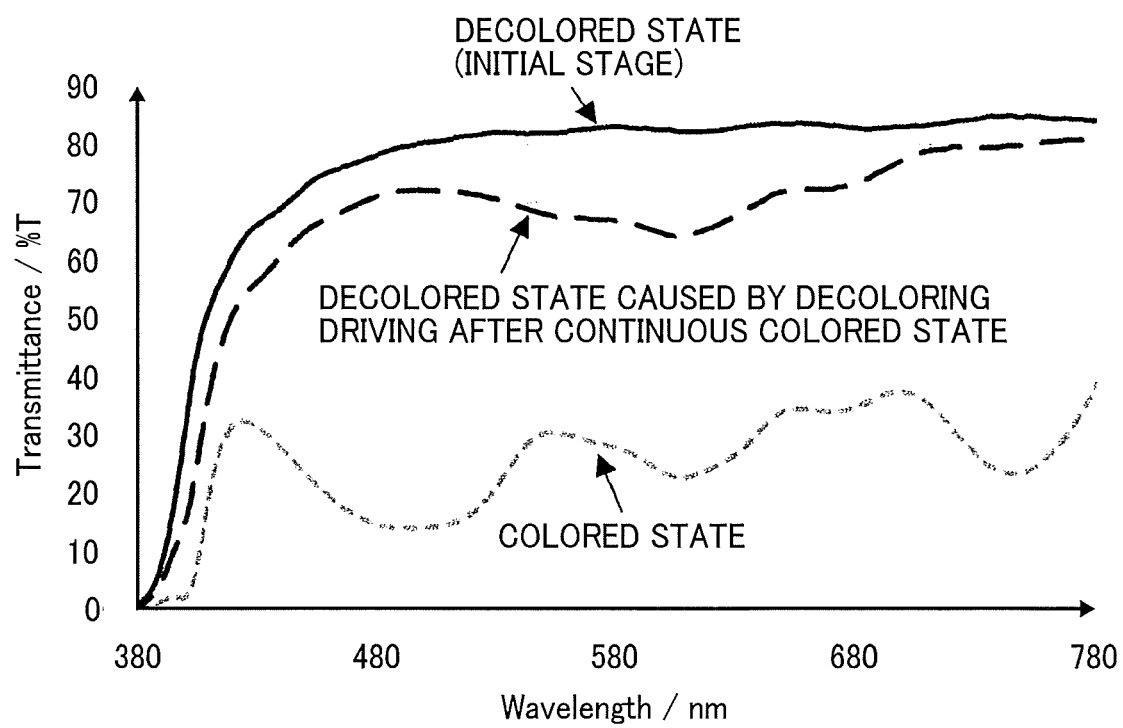

ELECTROCHROMIC DEVICE, ELECTRONIC DIMMING EYEGLASSES, AUGMENTED REALITY EYEGLASSES, AND CAMERA

CROSS-REFERENCE TO RELATED APPLICATIONS

This patent application is based on and claims priority pursuant to 35 U.S.C. § 119(a) to Japanese Patent Application No. 2018-051818, filed on Mar. 19, 2018 in the Japan Patent Office, the entire disclosure of which is hereby incorporated by reference herein.

BACKGROUND

Technical Field

The present disclosure relates to an electrochromic device, electronic dimming eyeglasses, augmented reality eyeglasses, and a camera.

Description of the Related Art

An electric light control device capable of controlling light transmittance by an electric signal is different from a light control device utilizing a photochromic phenomenon in which the transmittance is changed by irradiation with light such as ultraviolet rays. The electric light control device has been developed in various ways for its advantage that the transmittance is freely controllable by a user and is automatically increased in a dark place.

As an electric light control device, well-known are a liquid crystal device to which a liquid crystal material is applied and an electrochromic device to which an electrochromic material is applied. Particularly, the electrochromic device is transparent in a neutral state and is effective for acquiring a light controlling function with a high contrast ratio.

The electrochromic device utilizes a phenomenon called electrochromism in which color reversibly changes as a redox reaction reversibly occurs in response to application of electricity (voltage, current). Generally, electrochromism is displayed when a redox reaction occurs in a configuration in which an ion-conductive electrolyte layer is filled in between two opposing electrodes. When a reduction reaction occurs in the vicinity of one of the two opposing electrodes, an oxidation reaction, which is the reverse reaction, occurs in the vicinity of the other electrode.

Electrochromic materials have been developed for application to a light control device which controls the transmittance with electricity and for application to eyeglass lens.

In such a light control device, the contrast ratio between a transparent state (decolored state) and a colored state should be high. Therefore, it is preferable that one of the electrodes has a layer containing an oxidation-type electrochromic material and the other has a layer containing a reduction-type electrochromic material. This is because both the oxidation-type electrochromic material and the reduction-type electrochromic material are colored when electricity is applied to the device to increase the coloring density.

Charge to be held in the electrochromic material is mainly controlled by injection/extraction of charge from/to an external circuit. This is the same operation model as the charge/discharge phenomenon of secondary batteries.

It is known that the electrochromic device is capable of expressing gradation by controlling the density by controlling the applied voltage/current value. Various attempts have been made to achieve a driving method for expressing gradation and a driving method for improving responsiveness to coloring/decoloring.

SUMMARY

In accordance with some embodiment of the present invention, an electrochromic device reversibly and controllably colored and decolored by electricity is provided. The electrochromic device is configured to control at least one of the following functions f1 and f2 based on at least one of an operating environment temperature of the electrochromic device, a continuous elapsed time of a colored state or a decolored state, and an illuminance around the electrochromic device:

a function f1 of transiting to a colored state and/or limiting transition to a decolored state; and a function f2 of transiting to a decolored state and/or limiting transition to a colored state.

According to another embodiment, the electrochromic device includes at least one of an oxidation-type electrochromic material colorable upon oxidation by application of electricity and a reduction-type electrochromic material colorable upon reduction by application of electricity, and the electrochromic device has at least one of the following functions:

a function of transiting from a colored state to another colored state closer to a decolored state;

a function of transiting from a colored state to a decolored state;

a function of limiting transition from a decolored state to a colored state; and a function of inhibiting transition from a decolored state to a maximum colored state.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2C is a graph showing the transmittance in the visible region of an electrochromic device according to an embodiment of the present invention in a colored state and a decolored state;

Figure 1A:
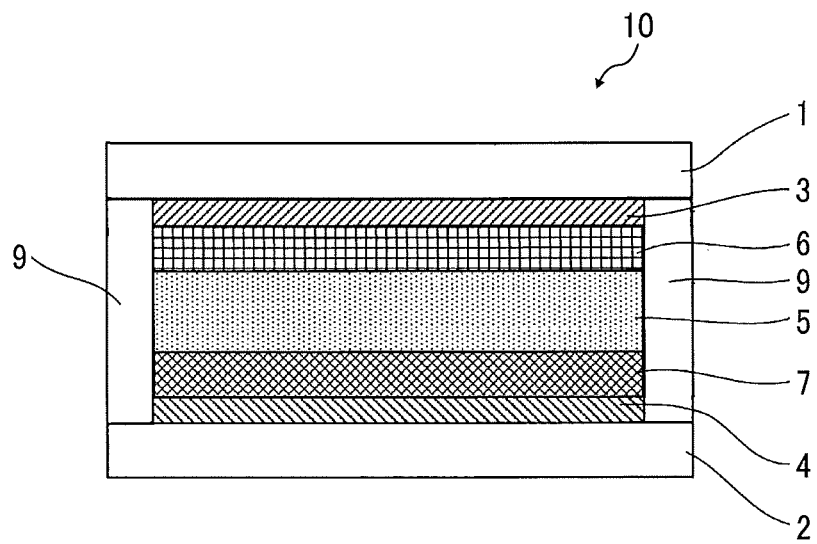
FIG. 1A is a schematic cross-sectional view of an electrochromic device according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In general, organic electrochromic materials are poor in durability and reliability, which is a problem for practical use. Specifically, when subjected to a light resistance test under exposure to sunlight, the organic electrochromic material is damaged by ultraviolet rays contained in sunlight and due to absorption of visible light, particularly when in a colored state.

Thus, the electrochromic device, which is an organic device, should be prevented from deteriorating to improve durability and reliability. Although the mechanisms of oxidation degradation of materials caused by light irradiation have been made clear, the mechanism of degradation caused by the driving method of the device has not been well understood.

Conventionally, methods for driving electrochromic devices have been mainly developed for the purpose of improving responsiveness to coloring/decoloring. There have been proposed very few driving methods for the purpose of improving durability and reliability.

As with ordinary organic devices, reliability (product life) of electrochromic devices largely depends on operating environments such as continuous driving time, temperature, and light.

However, most of conventional methods for driving electrochromic devices aim at improving functions, such as improving coloring/decoloring speed and reducing power consumption.

In view of this situation, the present disclosure proposes a driving method of an electrochromic device for ensuring reliability so that the function of the electrochromic device does not greatly deteriorate over the years (for example, during the product warranty time period).

Specifically, as an example, when an electrochromic device put in a colored state by application of electricity is excessively continuously driven to cause deterioration of the basic functions or exposed to a high temperature or a strong light with which the operation is not guaranteed, in other words, when the electrochromic device is required to continuously remain in a colored state, the electrochromic device is forcibly transited to a decolored state to ensure reliability of the electrochromic device.

When an electrochromic device, which is an organic device, is driven, molecular species in the ground state transits to the excited state and active species of charge carriers such as radical cations and radical anions are generated, thereby developing a coloring function. However, in addition to the development of the coloring function, in some cases, a side reaction occurs in cooperation with the function development process to induce deterioration. Since the electrochromic device develops the coloring function while repeating chemical reactions (electrochemical reactions) by exchange of electrons, it is very important to manage the conditions in the colored state, such as environmental temperature, illuminance, and continuous colored time, for ensuring durability and reliability. On the other hand, a redox material in a decolored state, i.e., a neutral state, is transparent and stable and is more durable and reliable than that in a colored state.

According to an embodiment of the present invention, an electrochromic device is provided that has excellent durability and reliability by being prevented from yellowing and insufficiently decoloring caused by continuous coloring driving.

An electrochromic device is capable of reversibly controlling coloring/decoloring by electricity (voltage, current) and of a type colored when electricity is applied or a type decolored when electricity is applied. Regardless of the type, a state in which electricity is applied is an unstable state such as an active state. Continuously keeping such a state results in deterioration of the material and deterioration of durability and reliability of the electrochromic device.

The inventors of the present invention have found that proper management of the conditions in colored and decolored states leads to ensuring of durability and reliability of the electrochromic device. Embodiments of the present invention provide an electrochromic device that ensures durability and reliability by properly managing the conditions in colored and decolored states such as environmental temperature, illuminance, and continuous colored time.

Embodiments (1) to (20) of the present invention are each described in detail below.

(1) First Embodiment

An electrochromic device of the present embodiment is reversibly and controllably colored and decolored by electricity, and is configured to control the following functions f1 and/or f2 based on at least one of an operating environment temperature of the electrochromic device, a continuous elapsed time of a colored state or a decolored state, and an illuminance around the electrochromic device:

a function f1 of transiting to a colored state and/or limiting transition to a decolored state; and a function f2 of transiting to a decolored state and/or limiting transition to a colored state.

An electrochromic device of the type colored by application of electricity is likely to deteriorate by temperature or light when in a colored state, particularly when continuously in a colored state ("continuous colored state"). Therefore, the electrochromic device of the type colored by application of electricity, when in a continuous colored state, demonstrates the function f2 of transiting to a decolored state based on at least one of the operating environment temperature of the electrochromic device, the continuous elapsed time of the colored or decolored state, and the illuminance around the electrochromic device, thereby ensuring durability and reliability of the electrochromic device. Even in a stable decolored state, when the electrochromic device is in an environment that causes deterioration when continuously colored, the electrochromic device demonstrates the function f2 of limiting transition to a colored state based on at least one of the operating environment temperature of the electrochromic device, the continuous elapsed time of the colored or decolored state, and the illuminance around the electrochromic device, thereby ensuring durability and reliability of the electrochromic device.

The function of transiting to a decolored state is not limited to completely transiting to the decolored state and preferably includes coming close to the decolored state (i.e., increasing transmittance) to be in a stable colored state. The function of limiting transition to a colored state is not limited to remaining in a decolored state and includes coming close to a stable colored state (i e, decreasing transmittance).

An electrochromic device of the type decolored by application of electricity is likely to deteriorate by temperature or light when in a decolored state, particularly when continuously in a decolored state ("continuous decolored state"). Therefore, the electrochromic device of the type decolored by application of electricity, when in a continuous decolored state, demonstrates the function f1 of transiting to a colored state based on at least one of the operating environment temperature of the electrochromic device, the continuous elapsed time of the colored or decolored state, and the illuminance around the electrochromic device, thereby ensuring durability and reliability of the electrochromic device. Even in a stable colored state, when the electrochromic device is in an environment that causes deterioration when continuously decolored, the electrochromic device demonstrates the function f1 of limiting transition to a decolored state based on at least one of the operating environment temperature of the electrochromic device, the continuous elapsed time of the colored or decolored state, and the illuminance around the electrochromic device, thereby ensuring durability and reliability of the electrochromic device.

The function of transiting to a colored state is not limited to completely transiting to a maximum colored state (i.e., a state in which the transmittance is minimum) and preferably includes coming close to a stable colored state (i.e., decreasing transmittance). The function of limiting transition to a decolored state is not limited to remaining in a maximum colored state and includes coming close to the decolored state (i.e., increasing transmittance) to be in a stable colored state.

The electrochromic device of the type colored by application of electricity has a function of transiting to a decolored state when in a continuous colored state and a function of limiting transition to a colored state when in a decolored state. These functions are operated and controlled based on data including the operating environment temperature of the electrochromic device, the continuous elapsed time of the colored state, and the illuminance around the electrochromic device. This is because the operating environment temperature of the electrochromic device, the continuous elapsed time of the colored state, and the illuminance around the electrochromic device are main factors for causing deterioration.

On the other hand, the electrochromic device of the type decolored by application of electricity has a function of transiting to a colored state when in a continuous decolored state and a function of limiting transition to a decolored state when in a colored state. These functions are operated according to a judgment based on the operating environment temperature of the electrochromic device, the continuous elapsed time of the colored state, and the illuminance around the electrochromic device. This is because the operating environment temperature of the electrochromic device, the continuous elapsed time of the colored state, and the illuminance around the electrochromic device are main factors for causing deterioration.

The third and subsequent embodiments described below provide electrochromic devices of the type colored by application of electricity, useful for a lens of electronic dimming eyeglasses, a light shielding filter of augmented reality eyeglasses, and a neutral density filter ("ND filter") for cameras and video cameras, for proper management of their conditions in the colored state. This is because the lens of electronic dimming eyeglasses, the light shielding filter of augmented reality eyeglasses, and the ND filter for cameras and video cameras are required to have a very high transmittance in a decolored state (for example, 80% or higher), which is suitably achieved with those of the type colored by application of electricity.

The electrochromic device of the type colored by application of electricity suitably includes an oxidization-type electrochromic material that is colorable upon oxidation by application of electricity and/or a reduction-type electrochromic material that is colorable upon reduction by application of electricity. Such an electrochromic device ensures durability and reliability by proper management of the conditions in the colored state such as environmental temperature, illuminance, and continuous colored time.

The oxidation-type electrochromic material and the reduction-type electrochromic material may be either a single compound or a composition containing various materials necessary for ensuring coloring/decoloring functions and memory property.

(2) Second Embodiment

An electrochromic device of the present embodiment is reversibly and controllably colored and decolored by electricity, and comprises at least one of an oxidation-type electrochromic material colorable upon oxidation by application of electricity and a reduction-type electrochromic material colorable upon reduction by application of electricity. The electrochromic device has at least one of the following functions: a function of transiting from a colored state to another colored state closer to a decolored state; a function of transiting from a colored state to a decolored state; a function of limiting transition from a decolored state to a colored state; and a function of inhibiting transition from a decolored state to a maximum colored state.

(3) Third Embodiment

The electrochromic device of the present embodiment is that of the second embodiment which further includes a temperature sensor configured to acquire an operating environment temperature of the electrochromic device and a memory configured to store a coloring limiting temperature.

The electrochromic device performs at least one of the following controls f3 and f4 based on conditions in a colored state or a decolored state:

a control f3, when in a decolored state, of limiting transition from the decolored state to a colored state when the operating environment temperature is higher than the coloring limiting temperature; and a control f4, when in a colored state, of transiting from the colored state to a decolored state when the operating environment temperature is higher than the coloring limiting temperature.

This device makes it possible to control transition from a decolored state to a colored state and transition from a colored state to a decolored state based on the operating environment temperature of the electrochromic device. Therefore, it is easy to manage conditions in the continuous colored state at high temperatures which may deteriorate durability and reliability, so that durability and reliability of the electrochromic device are enhanced.

(4) Fourth Embodiment

The electrochromic device of the present embodiment is that of the second embodiment which further includes a temperature sensor configured to acquire an operating environment temperature of the electrochromic device and a memory configured to store a coloring limiting temperature according to coloring density. The electrochromic device performs at least one of the following controls f5 and f6 based on conditions in a colored state or a decolored state:

a control f5, when in a decolored state, of limiting transition to a coloring density at which the operating environment temperature is higher than the coloring limiting temperature; and a control f6, when in a colored state and the operating environment temperature is higher than the coloring limiting temperature, of transiting to a coloring density at which the operating environment temperature is not higher than the coloring limiting temperature.

This device makes it possible to control transition from a decolored state to a colored state and transition from a colored state to a decolored state based on the operating environment temperature and the coloring density of the electrochromic device. Therefore, it is easy to manage conditions in the continuous colored state at high temperatures which may deteriorate durability and reliability, so that durability and reliability of the electrochromic device are enhanced.

(5) Fifth Embodiment

The electrochromic device of the present embodiment is that of the second embodiment, driven by continuous or intermittent application of electricity to maintain a colored state displaying a certain coloring density, which further includes a measuring device configured to measure a time period of a continuous colored state and a memory configured to store an upper limit time period allowing the continuous colored state regardless of coloring density. The electrochromic device transits from a colored state to a decolored state or to another colored state closer to the decolored state, when the time period of the continuous colored state exceeds the upper limit time period allowing the continuous colored state.

This device makes it possible to control transition from a colored state to a decolored state or to another colored state closer to the decolored state based on a clear judgment as to whether or not the time period of the continuous colored state exceeds the upper limit time period allowing the continuous colored state. Therefore, it is easy to manage conditions in the continuous colored state at high temperatures which may deteriorate durability and reliability, so that durability and reliability of the electrochromic device are enhanced.

(6) Sixth Embodiment

The electrochromic device of the present embodiment is that of the second embodiment, driven by continuous or intermittent application of electricity to maintain a colored state displaying a certain coloring density, which further includes a measuring device configured to measure a number of times of application of electricity for maintaining a continuous colored state and a memory configured to store an upper limit of the number of times of application of electricity allowing the continuous colored state. The electrochromic device transits from a colored state to a decolored state or to another colored state closer to the decolored state, when the number of times of application of electricity for maintaining the continuous colored state exceeds the upper limit of the number of times of application of electricity allowing the continuous colored state.

This device makes it possible to control transition from a colored state to a decolored state or to another colored state closer to the decolored state based on a clear judgment as to whether or not the number of times of application of electricity for maintaining the continuous colored state (corresponding to the time period of the continuous colored state) exceeds the upper limit of the number of times of application of electricity allowing the continuous colored state. Therefore, it is easy to manage conditions in the continuous colored state at high temperatures which may deteriorate durability and reliability, so that durability and reliability of the electrochromic device are enhanced.

(7) Seventh Embodiment

The electrochromic device of the present embodiment is that of the second embodiment, driven by continuous or intermittent application of electricity to maintain a colored state displaying a certain coloring density, which further includes a temperature sensor configured to acquire an operating environment temperature of the electrochromic device, a measuring device configured to measure a time period of a continuous colored state, and a memory configured to store an upper limit time period allowing the continuous colored state for each operating environment temperature. The electrochromic device transits from a colored state to a decolored state or to another colored state closer to the decolored state, when the time period of the continuous colored state exceeds the upper limit time period allowing the continuous colored state according to the operating environment temperature.

This device makes it possible to control transition from a colored state to a decolored state or to another colored state closer to the decolored state based on a clear judgment as to whether or not the time period of the continuous colored state exceeds the upper limit time period allowing the continuous colored state according to the operating environment temperature. Therefore, it is easy to manage conditions in the continuous colored state at high temperatures which may deteriorate durability and reliability, so that durability and reliability of the electrochromic device are enhanced.

(8) Eighth Embodiment

The electrochromic device of the present embodiment is that of the second embodiment, driven by continuous or intermittent application of electricity to maintain a colored state displaying a certain coloring density, which further includes a temperature sensor configured to acquire an operating environment temperature of the electrochromic device, a measuring device configured to measure a number of times of application of electricity for maintaining a continuous colored state, and a memory configured to store an upper limit of the number of times of application of electricity allowing the continuous colored state for each operating environment temperature. The electrochromic device transits from a colored state to a decolored state or to another colored state closer to the decolored state, when the number of times of application of electricity for maintaining the continuous colored state exceeds the upper limit of the number of times of application of electricity allowing the continuous colored state according to the operating environment temperature.

This device makes it possible to control transition from a colored state to a decolored state or to another colored state closer to the decolored state based on a clear judgment as to whether or not the number of times of application of electricity for maintaining the continuous colored state (corresponding to the time period of the continuous colored state) exceeds the upper limit of the number of times of application of electricity allowing the continuous colored state according to the operating environment temperature. Therefore, it is easy to manage conditions in the continuous colored state at high temperatures which may deteriorate durability and reliability, so that durability and reliability of the electrochromic device are enhanced.

(9) Ninth Embodiment

The electrochromic device of the present embodiment is that of the second embodiment, driven by continuous or intermittent application of electricity to maintain a colored state displaying a certain coloring density, which further includes a temperature sensor configured to acquire an operating environment temperature of the electrochromic device, an illuminance sensor configured to acquire an illuminance around the electrochromic device, a measuring device configured to measure a time period of a continuous colored state, and a memory configured to store an upper limit time period allowing the continuous colored state for each combination of the operating environment temperature and the illuminance. The electrochromic device transits from a colored state to a decolored state or to another colored state closer to the decolored state, when the time period of the continuous colored state exceeds the upper limit time period allowing the continuous colored state according to the combination of the operating environment temperature and the illuminance.

This device makes it possible to control transition from a colored state to a decolored state or to another colored state closer to the decolored state based on a clear judgment as to whether or not the time period of the continuous colored state exceeds the upper limit time period allowing the continuous colored state according to the combination of the operating environment temperature and the illuminance. Therefore, it is easy to manage conditions in the continuous colored state at high temperatures which may deteriorate durability and reliability, so that durability and reliability of the electrochromic device are enhanced.

(10) Tenth Embodiment

The electrochromic device of the present embodiment is that of the second embodiment, driven by continuous or intermittent application of electricity to maintain a colored state displaying a certain coloring density, which further includes a temperature sensor configured to acquire an operating environment temperature of the electrochromic device, an illuminance sensor configured to acquire an illuminance around the electrochromic device, a measuring device configured to measure a number of times of application of electricity for maintaining a continuous colored state, and a memory configured to store an upper limit of the number of times of application of electricity allowing the continuous colored state for each combination of the operating environment temperature and the illuminance. The electrochromic device transits from a colored state to a decolored state or to another colored state closer to the decolored state, when the number of times of application of electricity for maintaining the continuous colored state exceeds the upper limit of the number of times of application of electricity allowing the continuous colored state according to the combination of the operating environment temperature and the illuminance.

This device makes it possible to control transition from a colored state to a decolored state or to another colored state closer to the decolored state based on a clear judgment as to whether or not the number of times of application of electricity for maintaining the continuous colored state (corresponding to the time period of the continuous colored state) exceeds the upper limit of the number of times of application of electricity allowing the continuous colored state according to the combination of the operating environment temperature and the illuminance. Therefore, it is easy to manage conditions in the continuous colored state at high temperatures which may deteriorate durability and reliability, so that durability and reliability of the electrochromic device are enhanced.

In the above-described electrochromic devices according to the second to tenth embodiments of the present invention, each using a reduction-type electrochromic material the neutral state of which is transparent and/or an oxidation-type electrochromic material the neutral state of which is transparent, if a colored state is continuously maintained, the materials and device may deteriorate to degrade durability and reliability. Therefore, the time period of the continuous colored state or the number of times of application of electricity for maintaining the continuous colored state are managed according to the operating environment temperature of and the illuminance around the electrochromic device.

Parameter information, such as the upper limit time period allowing the continuous colored state or the upper limit of the number of times of application of electricity allowing the continuous colored state according to the operating environment temperature of and the illuminance around the electrochromic device, can be stored in a drive unit adjacent to the electrochromic device. The parameter information stored in the drive unit can be rewritten to the latest information in accordance with update, addition, deletion, etc., by an external device such as a mobile terminal.

Normally, the electrochromic device of the present disclosure transits from a colored state to a decolored state according to the operating environment temperature of and the illuminance around the electrochromic device. Alternatively, in a case in which the coloring density can be continually monitored and parameters such as the upper limit time period allowing the continuous colored state or the upper limit of the number of times of application of electricity allowing the continuous colored state can be set for each coloring density, the electrochromic device may transit from a colored state to another colored state closer to a decolored state, in place of transiting from a colored state to a decolored state. However, at the coloring density after the transition, durability and reliability should be ensured according to the operating environment temperature of and the illuminance around the electrochromic device.

Similarly, the electrochromic device of the present disclosure normally limits transition from a decolored state to a colored state according to the operating environment temperature of and the illuminance around the electrochromic device. Alternatively, in a case in which the coloring density can be continually monitored and parameters such as the upper limit time period allowing the continuous colored state or the upper limit of the number of times of application of electricity allowing the continuous colored state can be set for each coloring density, the electrochromic device may not only completely inhibit transition from a decolored state to a colored state but also allow transition to a coloring density at which durability and reliability are ensured according to the operating environment temperature of and the illuminance around the electrochromic device. The eleventh to thirteenth embodiments described below provide materials and device configurations for effectively ensuring durability and reliability.

(11) Eleventh Embodiment

The electrochromic device of the present embodiment is that of any of the second to tenth embodiments which includes: a first substrate and a second substrate opposed with a gap therebetween, at least one of them being transparent; a first electrode and a second electrode opposed with the first substrate and the second substrate, respectively, at least one of them being transparent; a first electrochromic layer on a surface of the first electrode which faces the second electrode, containing at least one of an oxidation-type electrochromic compound and an oxidation-type electrochromic composition; a second electrochromic layer on a surface of the second electrode which faces the first electrode, containing at least one of a reduction-type electrochromic compound and a reduction-type electrochromic composition; and an electrolyte between the first electrode and the second electrode.

(12) Twelfth Embodiment

The electrochromic device of the present embodiment is that of the eleventh embodiment in which the first electrochromic layer contains a cross-linked product of an electrochromic composition containing a triarylamine-containing radical polymerizable compound and another radical polymerizable compound different from the triarylamine-containing radical polymerizable compound. This embodiment provides an electrochromic device having excellent coloring/decoloring speed and high memory property.

(13) Thirteenth Embodiment

The electrochromic device of the present embodiment is that of the eleventh or twelfth embodiment in which the second electrochromic layer contains semiconducting metal oxide particles.

As the second electrochromic layer contains semiconducting metal oxide particles, an electrochromic device having excellent coloring/decoloring speed and high memory property is provided.

(14) Fourteenth Embodiment

The present embodiment relates to electronic dimming eyeglasses in which the electrochromic device of any of the second to thirteenth embodiments is incorporated as a lens.

(15) Fifteenth Embodiment

The present embodiment relates to augmented reality eyeglasses in which the electrochromic device of any of the second to thirteenth embodiments is incorporated as a light shielding filter.

(16) Sixteenth Embodiment

The present embodiment relates to a camera or a video camera in which the electrochromic device of any of the second to thirteenth embodiments is incorporated as a neutral density filter ("ND filter").

The ND filter for cameras or video cameras is required to have transparency. The materials and device configuration of the electrochromic devices of the eleventh to thirteenth embodiments provide a very high transmittance in a decolored state (for example, 80% or higher).

The camera or the video camera may not only function by themselves but also may be built in a product, such as a mobile terminal and a personal computer, to provide one function of the product.

(17) Seventeenth Embodiment

The present embodiment relates to electronic dimming eyeglasses in which the electrochromic device of any of the second to thirteenth embodiments is incorporated as a lens, which further includes a temple. When the temple is folded, the lens transits to a decolored state instantaneously or after a certain time period of time.

For detecting folding of the temple, a magnetic sensor may be used. The magnetic sensor places a small magnet on a moving object and detects approach, movement, or rotation of the object by capturing the strength of the magnetic field and its change. The magnetic sensor has been used to detect opening and closing of a foldable mobile phone for automatically shutting off the power supply of the backlight for the liquid crystal panel when the phone is closed (folded), or to detect opening and closing of a laptop computer, a refrigerator door, etc., and can also be used for embodiments of the present invention.

Examples of the magnetic sensor include: a sensor utilizing an element (Hall element) that generates an electromotive force by interaction between a magnetic field and a current called the Hall effect; and a sensor including a Wheatstone bridge configured with various magnetoresistive elements variable in electrical resistance depending on the strength of a magnetic field.

In addition to the magnetic sensor, it is also possible to provide a mechanism near the folded portion, such as a pin-like protrusion or lever protruding for pushing a fold detection switch.

(18) Eighteenth Embodiment

The present embodiment relates to electronic dimming eyeglasses in which the electrochromic device of any of the second to thirteenth embodiments is incorporated as a lens, which further includes a sensor configured to detect a wearing condition of the electronic dimming eyeglasses. When the sensor detects an abnormal wearing condition, the lens transits to a decolored state instantaneously or after a certain time period of time.

The sensor for detecting the wearing condition of the electronic dimming eyeglasses may be, for example, an ocular potential sensor, an acceleration sensor, or a gyro sensor. The ocular potential sensor may be provided on the inter-eyebrow portion of the frame and the left and right nose pads to detect blink and movement of the line of sight. The acceleration sensor and the gyro sensor may be provided on the temples to sense posture and body balance. Based on information detected by the sensor, it is possible to determine whether the electronic dimming eyeglasses are put on a person or removed from the person and placed somewhere. The sensor can be placed in any position according to the shape of the electronic dimming eyeglasses. The sensor is not limited to the above-described sensors and various sensors can be appropriately used.

(19) Nineteenth Embodiment

The present embodiment relates to augmented reality eyeglasses in which the electrochromic device of any of the second to thirteenth embodiments is incorporated as a light shielding filter, which further includes a sensor configured to detect a wearing condition of the augmented reality eyeglasses. When the sensor detects an abnormal wearing condition, the light shielding filter transits to a decolored state instantaneously or after a certain time period of time.

The sensor for detecting the wearing condition of the augmented reality eyeglasses may be, for example, an ocular potential sensor, an acceleration sensor, or a gyro sensor. The augmented reality eyeglasses may be in various shapes, but when in a shape similar to that of conventional eyeglasses, the ocular potential sensor may be provided on the inter-eyebrow portion of the frame and the left and right nose pads to detect blink and movement of the line of sight. Similarly, when the augmented reality eyeglasses are in a shape similar to that of conventional eyeglasses, the acceleration sensor and the gyro sensor may be provided on the temples to sense posture and body balance. Based on information detected by the sensor, it is possible to determine whether the augmented reality eyeglasses are put on a person or removed from the person and placed somewhere. The sensor can be placed in any position according to the shape of the augmented reality eyeglasses. The sensor is not limited to the above-described sensors and various sensors can be appropriately used.

(20) Twentieth Embodiment

The present embodiment relates to a camera or a video camera in which the electrochromic device of any of the second to thirteenth embodiments is incorporated as an ND filter. When the camera or the video camera ends operating, the ND filter transits to a decolored state instantaneously or after a certain time period of time.

The ND filter (neutral density filter) is used to reduce the amount of incident light.

The illuminance sensor to acquire the illuminance around the electrochromic device may be a general illuminance sensor, and a solar battery can also be used as the sensor.

Next, the electrochromic device according to an embodiment of the present invention is described with reference to the drawings. In each drawing, the same reference numerals are given to the same components, and redundant explanation may be omitted.

Structure of Electrochromic Device

Figure 1B:
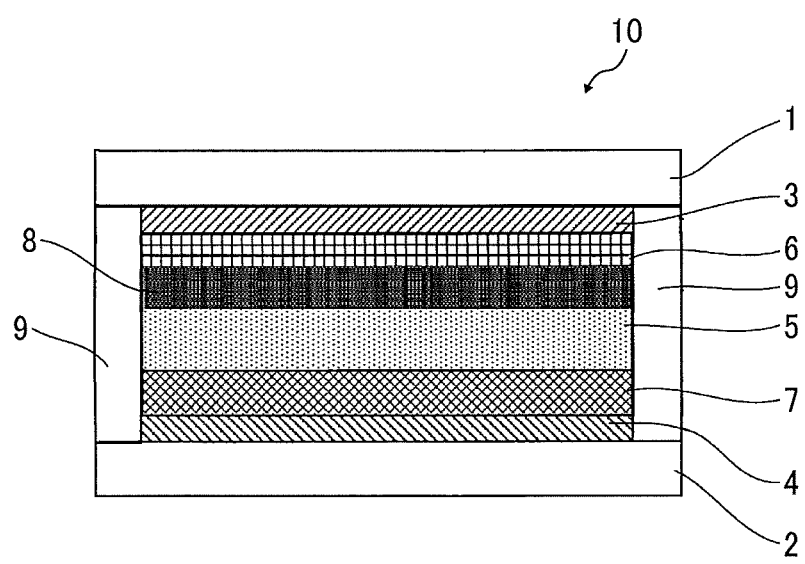
FIG. 1B is a schematic cross-sectional view of an electrochromic device according to an embodiment of the present invention.
Figure 1C:
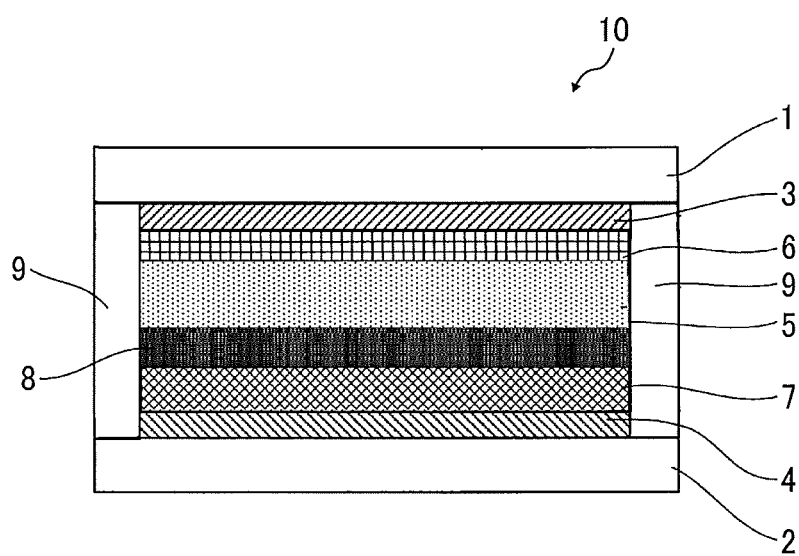
FIG. 1C is a schematic cross-sectional view of an electrochromic device according to an embodiment of the present invention.

FIGS. 1A to 1C are schematic cross-sectional views of an electrochromic device 10 according to an embodiment of the present invention.

The electrochromic device 10 illustrated in FIG. 1A includes: a first substrate 1 and a second substrate 2 opposed with a gap therebetween; a first electrode 3 and a second electrode 4 opposed with a gap therebetween; a first electrochromic layer 6 and a second electrochromic layer 7; and an electrolyte layer 5 disposed between the electrodes. Each layer is sealed with a sealing material 9.

In the embodiments illustrated in FIGS. 1B and 1C, an insulating porous layer 8 is further provided.

The insulating porous layer has a function of electrically insulating the first electrode 3 and the second electrode 4 from each other and another function of holding the electrolyte.

The material of the insulating porous layer is not particularly limited as long as it is porous. Preferred examples thereof include an organic material, an inorganic material, and a composite material thereof, having high insulating property and durability and excellent film formation property.

The insulating porous layer can be formed by: a sintering method in which polymer fine particles or inorganic particles are partially fused with each other via a binder to form pores between the particles; an extraction method in which solvent-soluble organic or inorganic substances and solvent-insoluble binders are formed into a layered structure, and the organic or inorganic substances are dissolved with a solvent to form pores; a foaming method; a phase inversion method in which a mixture of polymers is subjected to phase separation by handling a good solvent and a poor solvent; or a radiation irradiation method in which pores are formed by means of radiation.

The first electrochromic layer contains at least one of an oxidation-type electrochromic compound and an oxidation-type electrochromic composition, and the second electrochromic layer contains at least one of a reduction-type electrochromic compound and a reduction-type electrochromic composition. The inventors of the present invention have found that the device with above-described configuration provides excellent contrast in the change of transmittance or color, consumes lower amounts of power, and has excellent durability.

The first electrochromic layer comprises a material colorable by an oxidation reaction. The material colorable by an oxidation reaction is not particularly limited, but is preferably a polymerized product of a composition containing a triarylamine-containing radical polymerizable compound, for contrast and repeat durability.

The second electrochromic layer comprises a material colorable by a reduction reaction. Examples thereof include, but are not limited to, viologen compounds and dipyridine compounds. Preferably, the material colorable by a reduction reaction is supported on a conducting or semiconducting nanostructure via an adsorptive group, for responsiveness, contrast, and repeat durability. Details of these materials are described later.

It has been found that durability and reliability of the electrochromic device remarkably deteriorate when a colored state is continuously maintained. In particular, the higher the operating environment temperature of the electrochromic device, the larger the amount of deterioration under continuous coloring.

This is because the electrochromic device of the present embodiment develops a coloring function by generating active species of charge carriers, and in some cases, a side reaction occurs in cooperation with the process of developing the coloring function to induce deterioration and the side reaction is accelerated by temperature.

Therefore, in the present embodiment, the electrochromic device is forcibly decolored when various side reactions are likely to occur in cooperation with the process of developing the coloring function that induces deterioration, to suppress the side reactions.

Accordingly, a device having excellent durability and reliability is provided that maintains the properties of demonstrating excellent contrast in the change of transmittance and color and of consuming lower amounts of power for an extended period of time.

Each component of the electrochromic device is described in detail below.

Substrate

The substrates have a function of supporting the first electrode, the first electrochromic layer, the second electrode, the second electrochromic layer.

As the substrate, known organic materials and inorganic materials can be used as they are as long as they are transparent materials capable of supporting the above layers.

Specific examples of the substrate include, but are not limited to, a glass substrate made of non-alkali-glass, borosilicate glass, float glass, or soda-lime glass.

In addition, a resin substrate made of polycarbonate resin, acrylic resin, polyethylene, polyvinyl chloride, polyester, epoxy resin, melamine resin, phenol resin, polyurethane resin, or polyimide resin may also be used as the substrate. Such a resin substrate (resin film) provides a thin, lightweight, and flexible electrochromic device.

The substrate may have a surface coating such as a transparent insulating layer, a UV cut layer, and/or an antireflection layer, for improving vapor barrier property, gas barrier property, ultraviolet resistance, and visibility.

The shape of the substrate is not particularly limited and may be appropriately selected according to the purpose. For example, the substrate may be in a rectangular shape or a round shape. The substrate may be a laminated body of multiple materials. For example, a structure in which the electrochromic device is sandwiched between two glass substrates provides improved vapor barrier property and gas barrier property.

The substrate may be a lens having a spherical shape. In this case, a distortion of an image viewed over the electrochromic device is small, so that improvement of high viewing angle and designability can be expected. For example, when used for a dimming lens for eyeglasses or a window of an automobile, it is preferable to form an electrochromic light control device on a spherical surface. In particular, for lightweight and workability in applications for eyeglasses, it is preferable to form all the elements of the electrochromic light control device on the spherical surface.

The material of the lens is not particularly limited as long as it functions as a lens for eyeglasses, and can be appropriately selected according to the purpose. Preferably, the material of the lens is highly transparent, thin, and lightweight. Also, it is preferable that the amount of expansion due to heat history is as small as possible. Preferred materials are those having a high glass transition temperature (Tg) and those having a low linear expansion coefficient.

Specifically, in addition to glass, any material used or proposed for high refractive index spectacle lens can be used, such as episulfide resin, thiourethane resin, methacrylate resin, polycarbonate resin, urethane resin, and mixtures thereof. Further, if necessary, a hard coating or a primer for improving adhesion may be formed.

In the present disclosure, the lens includes those whose power (refractive index) is not adjusted, such as a simple glass plate.

First Electrode and Second Electrode

The materials for the first electrode 3 and the second electrode 4 are not particularly limited and commonly used conductors can be used therefor. As described above, at least one of the first electrode 3 and the second electrode 4 is a transparent electrode. The transparent electrode is not particularly limited as long as it is a transparent material having conductivity, and may be appropriately selected depending on the purpose. Specific examples of such a material include, but are not limited to, inorganic materials such as tin-doped indium oxide (ITO), fluorine-doped tin oxide (FTO), antimony-doped tin oxide (ATO), and zinc oxide. Among these, InSnO, GaZnO, SnO, $In_2O_3$, and ZnO are preferable.

Alternatively, a conductivity-improved transparent electrode, formed of a fine network of transparent carbon nanotube and other highly-conductive non-transmissive materials such as Au, Ag, Pt, and Cu, may be used. The thicknesses of the first electrode 3 and the second electrode 4 are so adjusted that these electrodes have proper electric resistance values required for causing redox reactions in the first electrochromic layer 6 and the second electrochromic layer 7.

For example, in a case in which the first electrode 3 and the second electrode 4 each comprise ITO, the average thicknesses of each of the first electrode 3 and the second electrode 4 is preferably about 50 to 500 nm.

The first electrode 3 and the second electrode 4 can be formed by vacuum vapor deposition, sputtering, or ion plating. The first electrode 3 and the second electrode 4 can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

First Electrochromic Layer

Preferably, the material colorable by an oxidation reaction contained in the first electrochromic layer comprises a cross-linked product of a first electrochromic composition containing a triarylamine-containing radical polymerizable compound and another radical polymerizable compound different from the triarylamine-containing radical polymerizable compound, for solubility and durability of the resulting polymer.

Here, the first electrochromic layer may comprise a polymerized product of a first electrochromic composition which contains the triarylamine-containing radical polymerizable compound, and may be laminated on the first electrode. Alternatively, two or more of the first electrochromic layers may be laminated on the first electrode. Alternatively, the first electrochromic layer may be laminated on a part of the first electrode.

Also, the first electrochromic layer may comprise a cross-linked product of a first electrochromic composition which contains the triarylamine-containing radical polymerizable compound and another radical polymerizable compound different from the triarylamine-containing radical polymerizable compound, and may be laminated on the first electrode. Alternatively, two or more of the first electrochromic layers may be laminated on the first electrode. Alternatively, the first electrochromic layer may be laminated on a part of the first electrode.

First Electrochromic Composition

The first electrochromic composition contains the triarylamine-containing radical polymerizable compound, preferably further contains another radical polymerizable compound different from the triarylamine-containing radical polymerizable compound, more preferably further contains a polymerization initiator, and optionally further contains other components as necessary.

Triarylamine-Containing Radical Polymerizable Compound

The triarylamine-containing radical polymerizable compound imparts an electrochromic function that is responsive to redox reactions on the surface of the first electrode. Examples of the triarylamine-containing radical polymerizable compound include a compound represented by the following formula (1).

  Formula (1)

In the formula (1), when n is 2, m is 0; and when n is 1, m is 0 or 1. At least one of A and B has a radical polymerizable functional group. A is represented by the following formula (2), and one of $R_1$ to $R_{15}$ is bound to B. B is represented by the following formula (3), and one of $R_{16}$ to $R_{21}$ is bound to A.

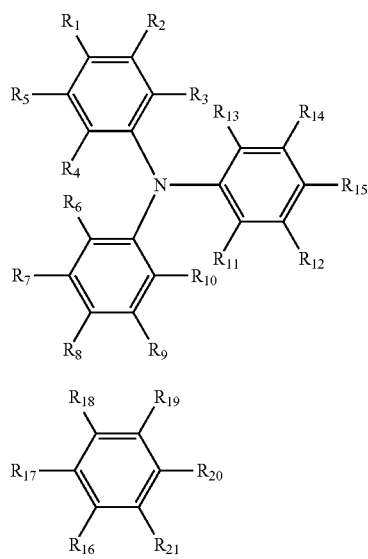

In the formulae (2) and (3), each of $R_1$ to $R_{21}$ independently represents a monovalent group, and at least one of the monovalent groups is a radical polymerizable functional group.

Monovalent Group

Specific examples of the monovalent group in the above formulae (2) and (3) include, but are not limited to, a hydrogen atom, a halogen atom, hydroxyl group, nitro group, cyano group, carboxyl group, a substituted or unsubstituted alkoxycarbonyl group, a substituted or unsubstituted aryloxycarbonyl group, a substituted or unsubstituted alkylcarbonyl group, a substituted or unsubstituted aryl carbonyl group, amide group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, sulfonic acid group, a substituted or unsubstituted alkoxysulfonyl group, a substituted or unsubstituted aryloxysulfonyl group, a substituted or unsubstituted alkylsulfonyl group, a substituted or unsubstituted arylsulfonyl group, sulfoneamide group, a substituted or unsubstituted monoalkylaminosulfonyl group, a substituted or unsubstituted dialkylaminosulfonyl group, a substituted or unsubstituted monoarylaminosulfonyl group, a substituted or unsubstituted diarylaminosulfonyl group, amino group, a substituted or unsubstituted monoalkylamino group, a substituted or unsubstituted dialkyl amino group, a substituted or unsubstituted alkyl group, a substituted or unsubstituted alkenyl group, a substituted or unsubstituted alkynyl group, a substituted or unsubstituted aryl group, a substituted or unsubstituted alkoxy group, a substituted or unsubstituted aryloxy group, a substituted or unsubstituted alkylthio group, a substituted or unsubstituted arylthio group, and a substituted or unsubstituted heterocyclic group.

Among these groups, alkyl group, alkoxy group, hydrogen atom, aryl group, aryloxy group, halogen atom, alkenyl group, and alkynyl group are preferable for stable operation and light resistance.

Specific examples of the halogen atom include, but are not limited to, fluorine atom, chlorine atom, bromine atom, and iodine atom.

Specific examples of the alkyl group include, but are not limited to, methyl group, ethyl group, propyl group, and butyl group.

Specific examples of the aryl group include, but are not limited to, phenyl group and naphthyl group. Specific examples of the aralkyl group include, but are not limited to, benzyl group, naphthylmethyl group, and phenethyl group.

Specific examples of the alkoxy group include, but are not limited to, methoxy group, ethoxy group, and propoxy group.

Specific examples of the aryloxy group include, but are not limited to, phenoxy group, 1-naphthyloxy group, 2-naphthyloxy group, 4-methoxyphenoxy group, and 4-methylphenoxy group.

Specific examples of the heterocyclic group include, but are not limited to, carbazole, dibenzofuran, dibenzothiophene, oxadiazole, and thiadiazole.

The substituent may be further substituted with a substituent, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g., benzyl group, phenethyl group).

Radical Polymerizable Functional Group

Here, the radical polymerizable functional group refers to a radical polymerizable group having a carbon-carbon double bond. Specific examples of the radical polymerizable functional group include, but are not limited to, 1-substituted ethylene functional groups and 1,1-substituted ethylene functional groups described below.

(1) Specific examples of the 1-substituted ethylene functional groups include, but are not limited to, a functional group represented by the following formula (i).

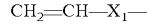  Formula (i)

In the formula (i), $X_1$ represents a substituted or unsubstituted arylene group, a substituted or unsubstituted alkenylene group, —CO— group, —COO— group, or —CON ($R_{100}$)— group (where $R_{100}$ represents a hydrogen atom, an alkyl group, an aralkyl group, or an aryl group), or —S— group.

Specific examples of the arylene group in the formula (i) include, but are not limited to, a substituted or unsubstituted phenylene group and naphthylene group.

Specific examples of the alkenylene group include, but are not limited to, ethenylene group, propenylene group, and butenylene group.

Specific examples of the alkyl group include, but are not limited to, methyl group and ethyl group.

Specific examples of the aralkyl group include, but are not limited to, benzyl group, naphthylmethyl group, and phenethyl group.

Specific examples of the aryl group include, but are not limited to, phenyl group and naphthyl group. Specific examples of the radical polymerizable functional group represented by the formula (i) include, but are not limited to, vinyl group, styryl group, 2-methyl-1,3-butadienyl group, vinyl carbonyl group, acryloyloxy group, acryloylamide group, and vinyl thioether group.

(2) Specific examples of the 1,1-substituted ethylene functional groups include, but are not limited to, a functional group represented by the following formula (ii).

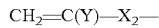

$CH_2=C(Y)-X_2-$   Formula (ii)

In the formula (ii), Y represents a substituted or unsubstituted alkyl group, a substituted or unsubstituted aralkyl group, a substituted or unsubstituted aryl group, a halogen atom, cyano group, nitro group, an alkoxy group, or —$COOR_{101}$ group (where $R_{101}$ represents a hydrogen atom, a substituted or unsubstituted alkyl group, a substituted or unsubstituted aralkyl group, a substituted or unsubstituted aryl group, or $CONR_{102}R_{103}$ (where each of $R_{102}$ and $R_{103}$ independently represents a hydrogen atom, a substituted or unsubstituted alkyl group, a substituted or unsubstituted aralkyl group, or a substituted or unsubstituted aryl group)). $X_2$ represents a substituent, such as those exemplified for $X_1$ in the formula (i), a single bond, or an alkylene group. At least one of Y and $X_2$ represents oxycarbonyl group, cyano group, an alkenylene group, or an aromatic ring.

Specific examples of the aryl group in the formula (ii) include, but are not limited to, phenyl group and naphthyl group.

Specific examples of the alkyl group include, but are not limited to, methyl group and ethyl group.

Specific examples of the alkoxy group include, but are not limited to, methoxy group and ethoxy group.

Specific examples of the aralkyl group include, but are not limited to, benzyl group, naphthylmethyl group, and phenethyl group.

Specific examples of the radical polymerizable functional group represented by the formula (ii) include, but are not limited to, α-acryloyloxy chloride group, methacryloyloxy group, α-cyanoethylene group, α-cyanoacryloyloxy group, α-cyanophenylene group, and methacryloyl amino group.

$X_1$, $X_2$, and Y may be further substituted with a substitute, such as a halogen atom, nitro group, cyano group, an alkyl group (e.g., methyl group, ethyl group), an alkoxy group (e.g., methoxy group, ethoxy group), an aryloxy group (e.g., phenoxy group), an aryl group (e.g., phenyl group, naphthyl group), and an aralkyl group (e.g. benzyl group, phenethyl group).

In particular, acryloyloxy group and methacryloyloxy group are preferred as the radical polymerizable functional group.

Specific preferred examples of the triarylamine-containing radical polymerizable compound include compounds represented by the following formulae (1-1) to (1-3).

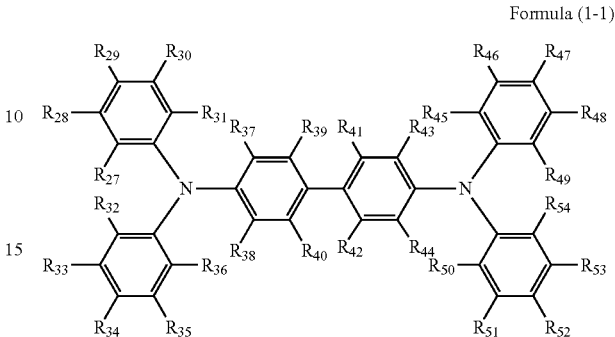

Formula (1-1)

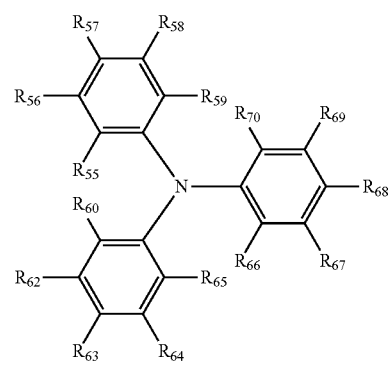

Formula (1-2)

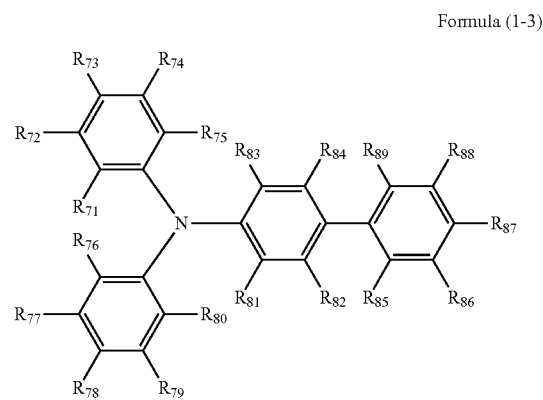

Formula (1-3)

In the formulae (1-1) to (1-3), each of $R_{27}$ to $R_{89}$ independently represents a monovalent organic group, and at least one of the monovalent organic groups is a radical polymerizable functional group.

Specific examples of the monovalent organic group and the radical polymerizable functional group include those in the above formula (I).

Specific examples of the compounds represented by any of the formula (1) and the formulae (1-1) to (1-3) include the following example compounds, but are not limited thereto. The triarylamine-containing radical polymerizable compound is not limited to these compounds.

Example Compound (1)
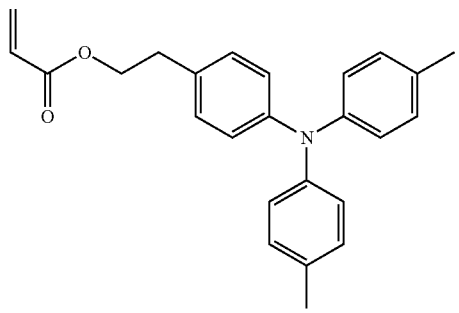
Example Compound (2)
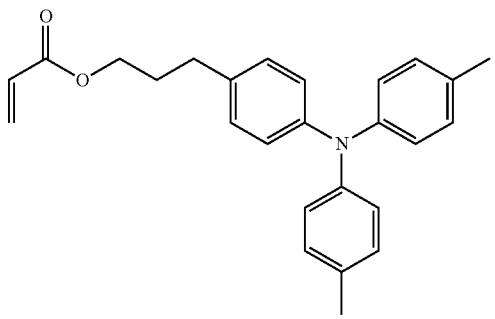
Example Compound (3)
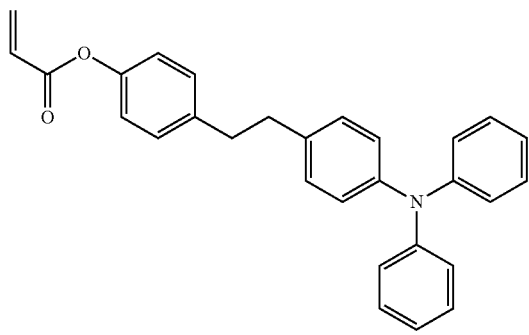
Example Compound (4)
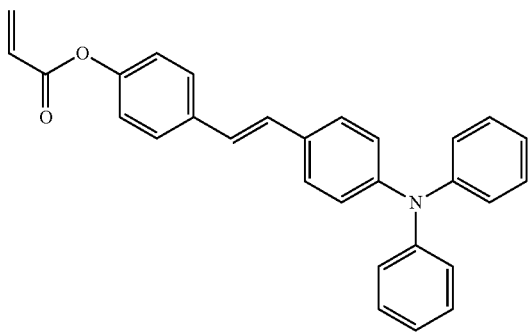
Example Compound (5)
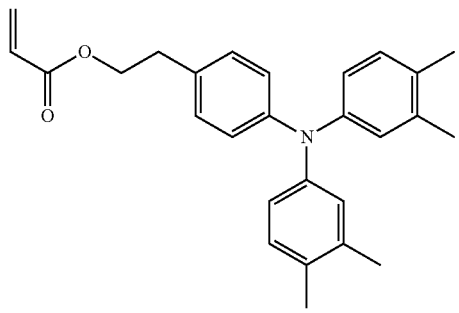
Example Compound (6)
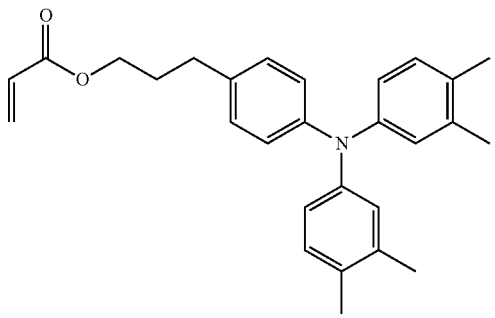
Example Compound (7)
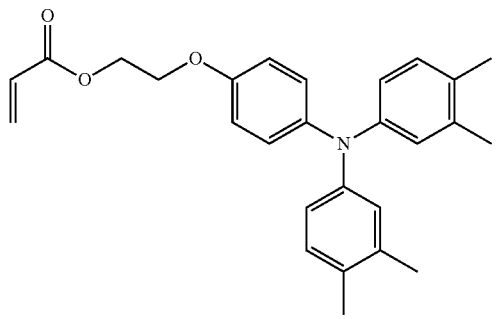
Example Compound (8)
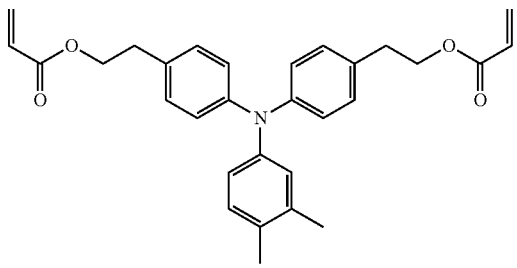

-continued
Example Compound (9)
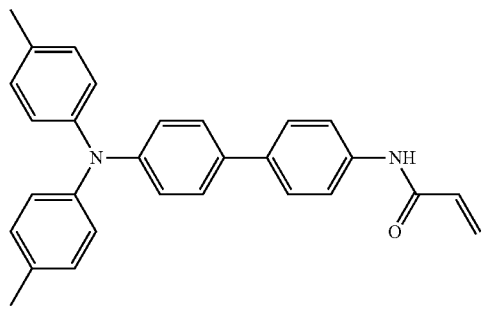
Example Compound (10)
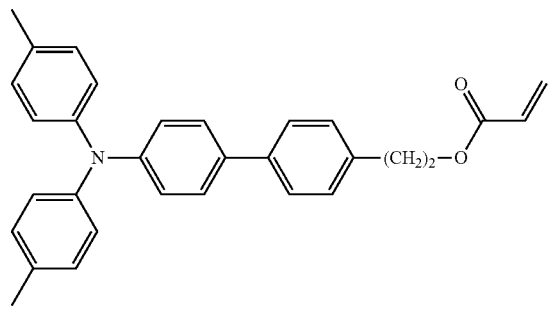
Example Compound (11)
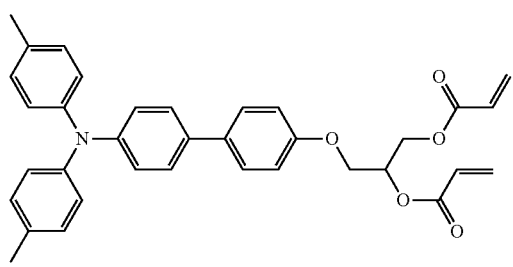
Example Compound (12)
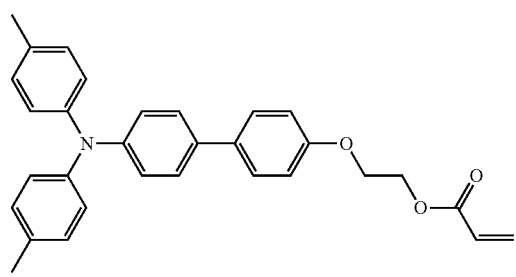
Example Compound (13)
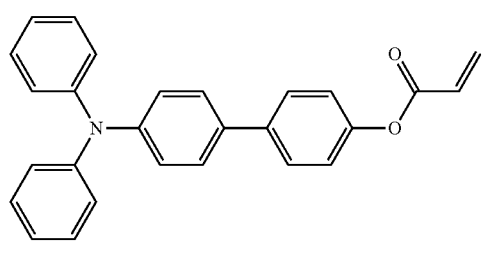
Example Compound (14)
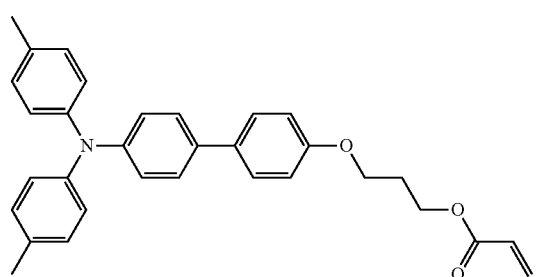
Example Compound (15)
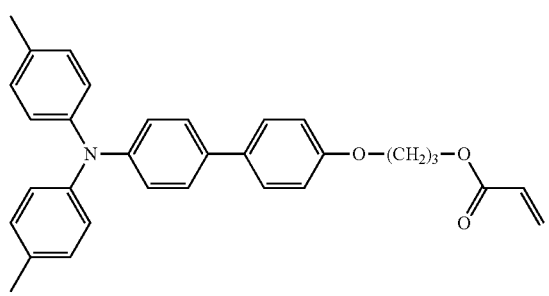
Example Compound (16)
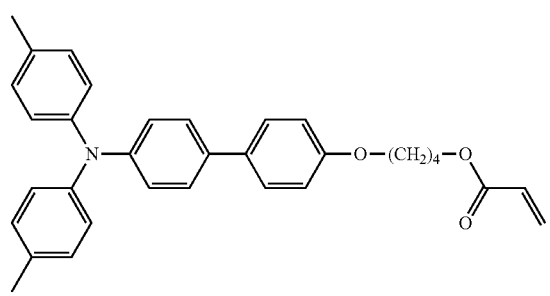
Example Compound (17)
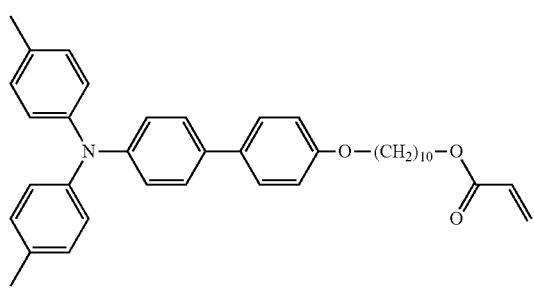
Example Compound (18)
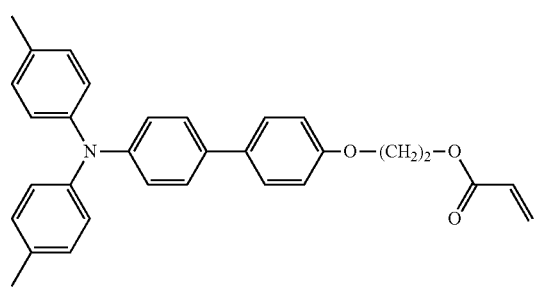

-continued
Example Compound (19)
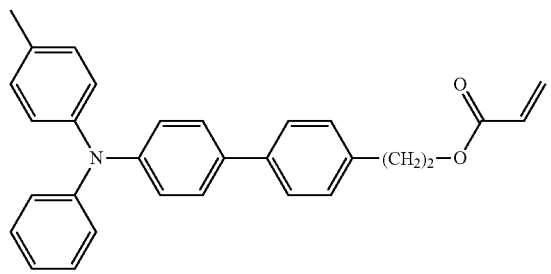
Example Compound (20)
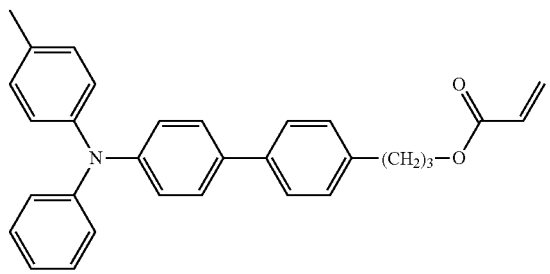
Example Compound (21)
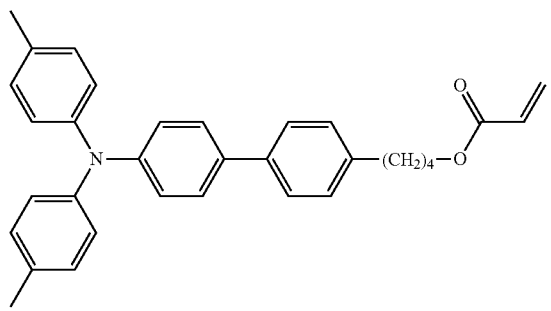
Example Compound (22)
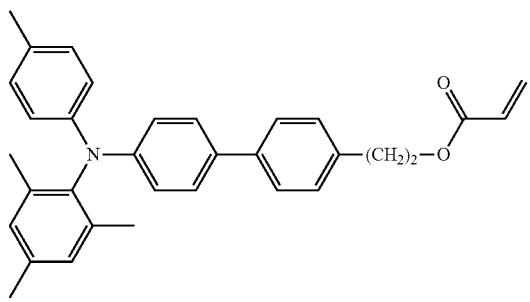
Example Compound (23)
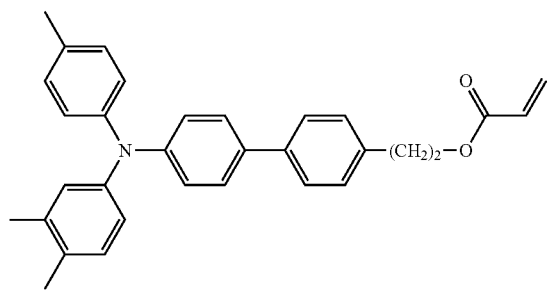
Example Compound (24)
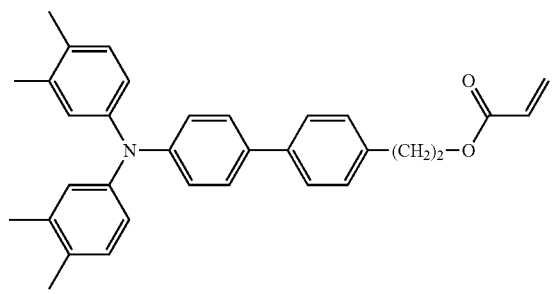
Example Compound (25)
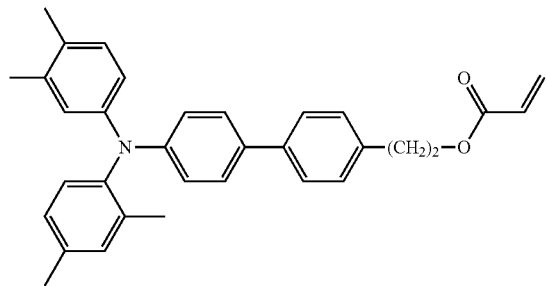
Example Compound (26)
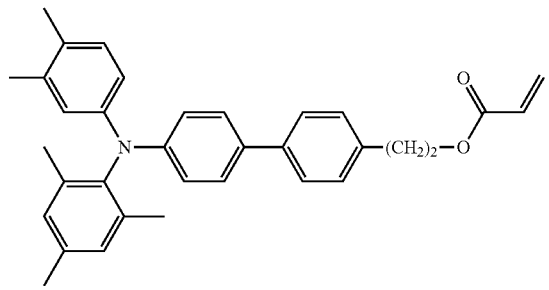
Example Compound (27)
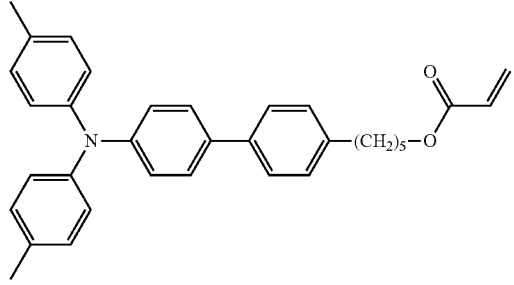
Example Compound (28)
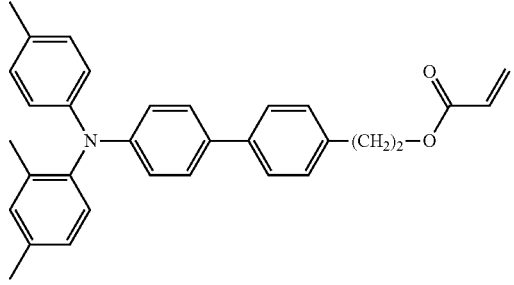

-continued
Example Compound (29)
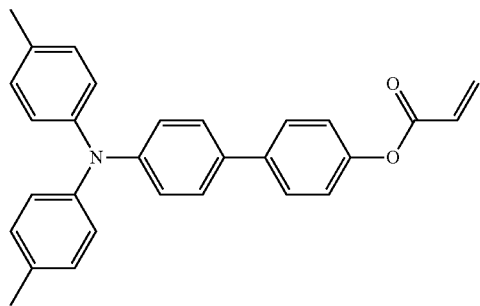
Example Compound (30)
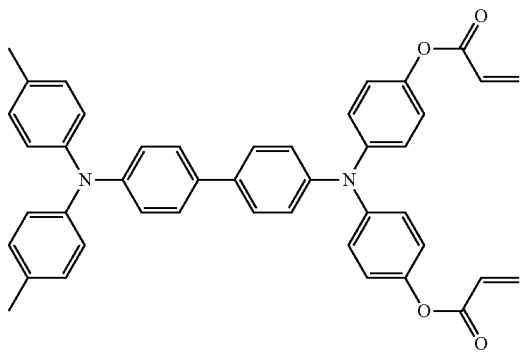
Example Compound (31)
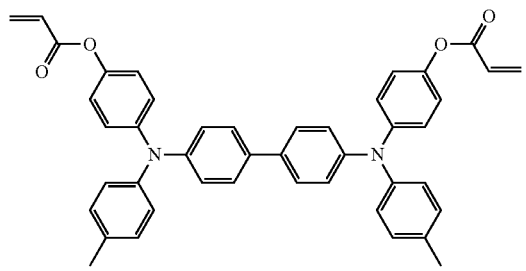
Example Compound (32)
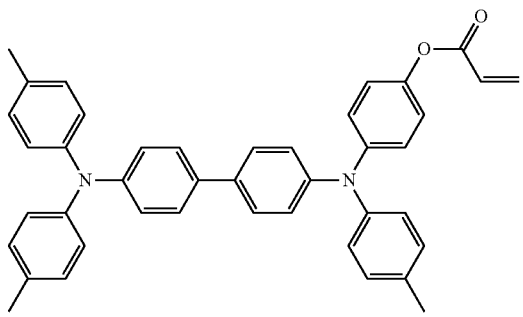
Example Compound (33)
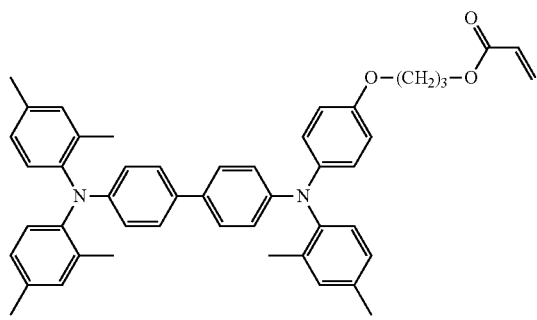
Example Compound (34)
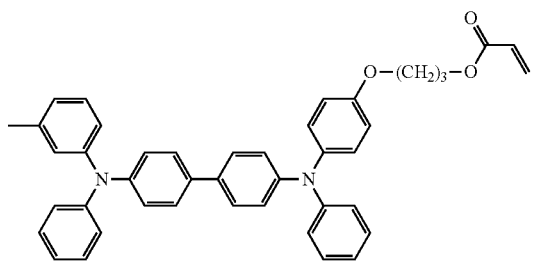
Example Compound (35)
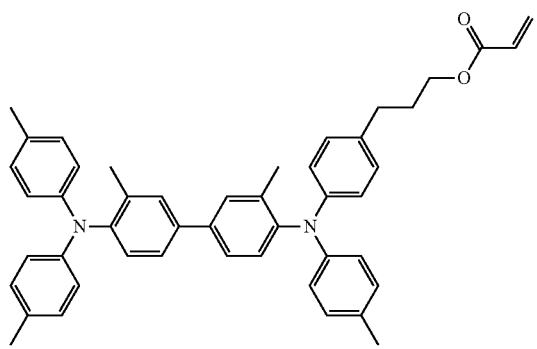

-continued
Example Compound (36)
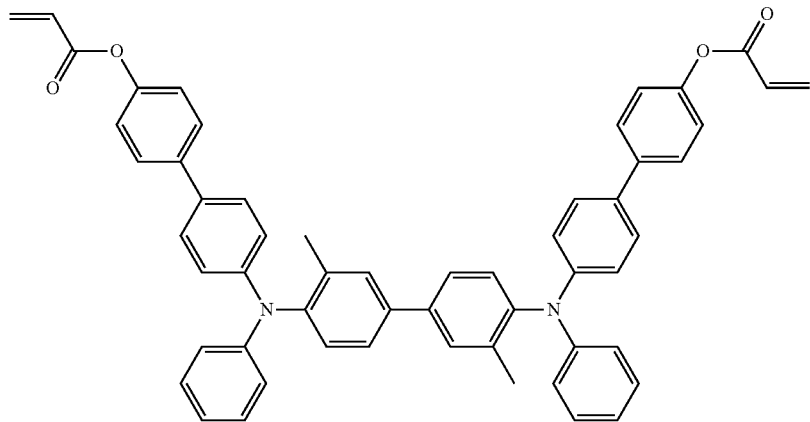
Example Compound (37)
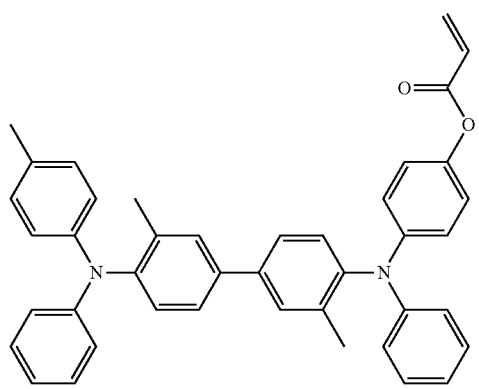
Example Compound (38)
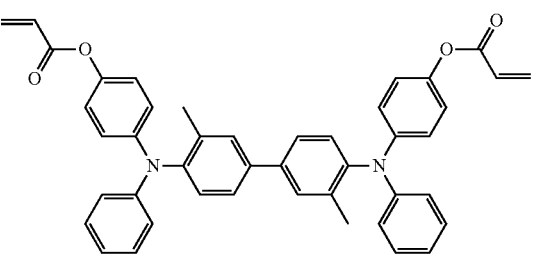
Example Compound (39)
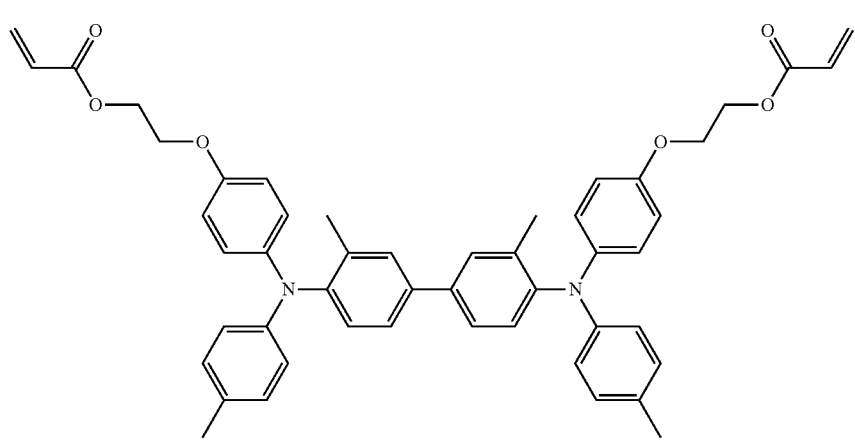

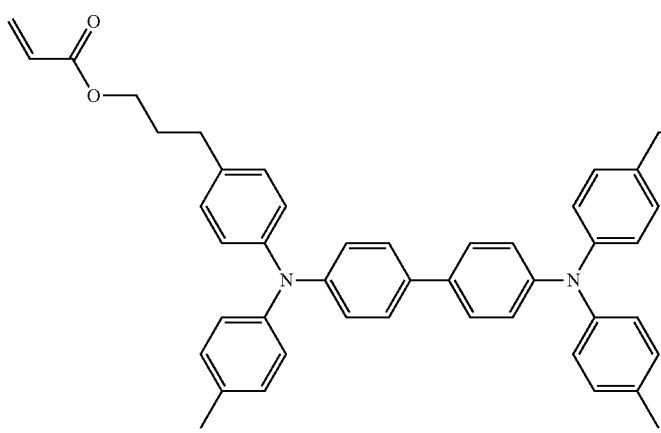

Example Compound (40)

Other Radical Polymerizable Compound

The radical polymerizable compound different from the triarylamine-containing radical polymerizable compound (hereinafter "the other radical polymerizable compound") has at least one radical polymerizable functional group.

Specific examples of the other radical polymerizable compound include, but are not limited to, monofunctional radical polymerizable compounds, difunctional radical polymerizable compounds, trifunctional and more-functional radical polymerizable compounds, functional monomers, and radical polymerizable oligomers. Among these compounds, difunctional and more-functional radical polymerizable compounds are preferable.

Examples of the radical polymerizable functional group included in the other radical polymerizable compound are the same as the examples of the radical polymerizable functional group included in the triaryl amine-containing radical polymerizable compound. In particular, acryloyloxy group and methacryloyloxy group are preferred as the radical polymerizable functional group.

Specific examples of the monofunctional radical polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these compounds can be used alone or in combination with others.

Specific examples of the difunctional radical polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, and neopentyl glycol diacrylate. Each of these compounds can be used alone or in combination with others.

Specific examples of the trifunctional and more-functional radical polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPA-modified trimethylolpropane trim ethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these compounds can be used alone or in combination with others.

In the above descriptions, "EO-modified" and "PO-modified" represent "ethyleneoxy-modified" and "propyleneoxy-modified", respectively.

Specific examples of the functional monomers include, but are not limited to: fluorine-substituted monomers, such as octafluoropentyl acrylate, 2-perfluorooctylethyl acrylate, 2-perfluorooctylethyl methacrylate, and 2-perfluoroisononylethyl acrylate; polysiloxane-group-containing vinyl monomers having 20 to 70 siloxane repeating units disclosed in JP-05-60503-B and JP-06-45770-B, such as acryloyl polydimethylsiloxane ethyl, methacryloyl polydimethylsiloxane ethyl, acryloyl polydimethylsiloxane propyl, acryloyl polydimethylsiloxane butyl, diacryloyl polydimethylsiloxane diethyl; and acrylates and methacrylates. Each of these compounds can be used alone or in combination with others.

Specific examples of the radical polymerizable oligomers include, but are not limited to, epoxy acrylate oligomers, urethane acrylate oligomers, and polyester acrylate oligomers.

Preferably, at least one of the triarylamine-containing radical polymerizable compound and the other radical polymerizable compound different from the triarylamine-containing radical polymerizable compound has two or more radical polymerizable functional groups in view of an effective formation of a cross-lined product.

Preferably, the content of the triarylamine-containing radical polymerizable compound in the first electrochromic composition is in the range of from 10% to 100% by mass, more preferably from 30% to 90% by mass.

When the content is 10% by mass or more, the first electrochromic layer exhibits a sufficient electrochromic function, high durability against repeated use under application of voltage, and high color developing sensitivity.

Even when the content is 100% by mass, the electrochromic layer is able to exhibit an electrochromic function. In this case, the color developing sensitivity of the electrochromic layer is high with respect to the thickness thereof. At the same time, by contrast, there may be a case in which the the first electrochromic layer becomes less compatible with an ionic liquid that is needed for giving and receiving charge, thereby causing deterioration of durability against repeated use under application of voltage and deterioration of electric properties. Although it depends on the process with which the electrochromic device is to be used, a preferred content is in the range of from 30% to 90% by mass for achieving a balance between color developing sensitivity and durability against repeated use.

Polymerization Initiator

Preferably, the first electrochromic composition further contains a polymerization initiator for more efficiently proceeding the cross-linking reaction between the triarylamine-containing radical polymerizable compound and the other radical polymerizable compound different from the triarylamine-containing radical polymerizable compound.

Examples of the polymerization initiator include, but are not limited to, thermal polymerization initiators and photopolymerization initiators. Photopolymerization initiators are more preferable for polymerization efficiency.

Specific examples of the thermal polymerization initiators include, but are not limited to, peroxide initiators (e.g., 2,5-dimethylhexane-2,5-dihydroperoxide, dicumyl peroxide, benzoyl peroxide, t-butylcumyl peroxide, 2,5-dimethyl-2,5-di(peroxybenzoyl)hexine-3, di-t-butyl peroxide, t-butyl hydroperoxide, cumene hydroperoxide, lauroyl peroxide) and azo initiators (e.g., azobisisobutyronitrile, azobiscyclohexanecarbonitrile, azobis(methyl isobutyrate), azobisisobutyl amidine hydrochloride, 4,4'-azobis-4-cyanovaleric acid). Each of these compounds can be used alone or in combination with others.

Specific examples of the photopolymerization initiators include, but are not limited to, acetophenone or ketal photopolymerization initiators (e.g., di ethoxyacetophenone, 2,2-dimethoxy-1,2-diphenylethane-1-one, 1-hydroxy-cyclohexyl-phenyl-ketone, 4-(2-hydroxyethoxy)phenyl-(2-hydroxy-2-propyl) ketone, 2-benzyl-2-dimethylamino-1-(4-morpholinophenyl)butanone-1,2-hydroxy-2-methyl-1-phenylpropane-1-one, 2-methyl-2-morpholino(4-methylthiophenyl)propane-1-one, 1-phenyl-1,2-propanedione-2-(o-ethoxycarbonyl)oxime), benzoin ether photopolymerization initiators (e.g., benzoin, benzoin methyl ether, benzoin ethyl ether, benzoin isobutyl ether, benzoin isopropyl ether), benzophenone photopolymerization initiators (e.g., benzophenone, 4-hydroxybenzophenone, methyl o-benzoylbenzoate, 2-benzoyl naphthalene, 4-benzoyl biphenyl, 4-benzoyl phenyl ether, acrylated benzophenone, 1,4-benzoyl benzene), and thioxanthone photopolymerization initiators (e.g., 2-isopropyl thioxanthone, 2-chlorothioxanthone, 2,4-dimethylthioxanthone, 2,4-diethylthioxanthone, 2,4-dichlorothioxanthone).

Specific examples of the photopolymerization initiators further include, but are not limited to, ethylanthraquinone, 2,4,6-trimethylbenzoyldiphenylphosphine oxide, 2,4,6-trimethylbenzoylphenylethoxyphosphine oxide, bis(2,4,6-trimethylbenzoyl)phenylphosphine oxide, bis(2,4-dimethoxybenzoyl)-2,4,4-trimethylpentylphosphine oxide, methylphenylglyoxy ester, 9,10-phenanthrene, acridine compounds, triazine compounds, and imidazole compounds. Each of these compounds can be used alone or in combination with others. In addition, a photopolymerization accelerator may be used alone or in combination with the photopolymerization initiator. Specific examples of the photopolymerization accelerator include, but are not limited to, triethanolamine, methyldimethanolamine, ethyl 4-dimethylaminobenzoate, isoamyl 4-dimethylaminobenzoate, (2-dimethylamino)ethyl benzoate, and 4,4'-dimethylaminobenzophenone. Preferably, the content of the polymerization initiator is in the range of from 0.5 to 40 parts by mass, more preferably from 1 to 20 parts by mass, based on 100 parts by mass of the total radical polymerizable compounds.

Other Components

Examples of the other components include, but are not limited to, a solvent, a plasticizer, a leveling agent, a sensitizer, a dispersant, a surfactant, an antioxidant, and a filler.

Method of Forming First Electrochromic Layer

The first electrochromic layer containing a polymerized product of the triarylamine-containing radical polymerizable compound can be formed by a method described below.

The method of forming the first electrochromic layer preferably includes an application process and a cross-linking process and optionally includes other processes as necessary.

Application Process

In the application process, an electrochromic composition containing the triarylamine-containing radical polymerizable compound and the other radical polymerizable compound different from the triarylamine-containing radical polymerizable compound is applied onto the first electrode.

Examples of the triarylamine-containing radical polymerizable compound and the other radical polymerizable compound different from the triarylamine-containing radical polymerizable compound are the same as the examples thereof used for the electrochromic device described above.

An application liquid containing the triarylamine-containing radical polymerizable compound and the other radical polymerizable compound different from the triarylamine-containing radical polymerizable compound is applied. The application liquid may be diluted with a solvent, if necessary, before being applied.

Specific examples of the solvent include, but are not limited to, alcohol solvents (e.g., methanol, ethanol, propanol, butanol), ketone solvents (e.g., acetone, methyl ethyl ketone, methyl isobutyl ketone, cyclohexanone), ester solvents (e.g., ethyl acetate, butyl acetate), ether solvents (e.g., tetrahydrofuran, dioxane, propyl ether), halogen solvents (e.g., dichloromethane, dichloroethane, trichloroethane, chlorobenzene), aromatic solvents (e.g., benzene, toluene, xylene), and cellosolve solvents (e.g., methyl cellosolve, ethyl cellosolve, cellosolve acetate). Each of these compounds can be used alone or in combination with others.

The rate of dilution is determined depending on solubility of the first electrochromic composition, application method, and a target thickness of the electrochromic layer.

The application method may be of, for example, dip coating, spray coating, bead coating, and ring coating.

Cross-Linking Process

In the cross-linking process, the applied first electrochromic composition is given with heat or light energy to undergo a cross-linking reaction.

Specifically, the first electrochromic composition applied onto the first electrode is given with external energy to be cured, thus forming a first electrochromic layer.

The external energy may be, for example, heat energy, light energy, or radial rays.

Heat energy may be given by heating the application liquid on the first electrode from the coated-surface side or the opposite substrate-side, using a gaseous substance (e.g., air, nitrogen gas), vapor, a heat medium, infrared ray, or electromagnetic wave.

In this case, preferably, the heating temperature is in the range of from 60° C. to 170° C., but is not limited thereto.

Light energy may be given from a UV light source having a main light-emitting wavelength within the ultraviolet rage, such as a high-pressure mercury lamp and a metal halide lamp, or a visible light source which emits light corresponding to the absorption wavelength of the radical polymerizable compounds and/or the photopolymerization initiator.

In this case, preferably, the amount of light emission is in the range of from 5 to 15,000 mW/cm².

When the material colorable by an oxidation reaction comprises at least one of a Prussian blue complex and a nickel oxide, which is other than a polymerized product of a composition containing the triarylamine-containing radical polymerizable compound, the first electrochromic layer may be formed by vacuum deposition, sputtering, or ion plating.

The first electrochromic layer can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Preferably, the first electrochromic layer has an average thickness of from 0.1 to 30 μm, more preferably from 0.4 to 10 μm.

Second Electrochromic Layer

Specific examples of an electrochromic material colorable by a reduction reaction contained in the second electrochromic layer include, but are not limited to, low-molecular-weight organic electrochromic compounds of azobenzene type, anthraquinone type, diarylethene type, dihydroprene type, dipyridine type, styryl type, styrylspiropyran type, spirooxazine type, spirothiopyran type, thioindigo type, tetrathiafulvalene type, terephthalic acid type, triphenylmethane type, triphenylamine type, naphthopyran type, viologen type, pyrazoline type, phenazine type, phenylenediamine type, phenoxazine type, phenothiazine type, phthalocyanine type, fluoran type, fulgide type, benzopyran type, and metallocene type. Each of these compounds can be used alone or in combination with others.

Among these compounds, viologen compounds and dipyridine compounds are preferable since they exhibit excellent coloring/decoloring potential and color values.

Specific examples of the viologen compounds include, but are not limited to, those disclosed in JP-3955641-B and JP-2007-171781-A.

The viologen compound is preferably used in combination with a titanium oxide particle. By combining the viologen compound and a titanium oxide particle, advantageously, optical density and contrast can be maintained high.

Specific examples of the dipyridine compounds include, but are not limited to, those disclosed in JP-2007-171781-A and JP-2008-116718-A.

Among these compounds, a dipyridine compound represented by the following formula (4) is preferable since it exhibits excellent color values.

Formula (4)

In the formula (4), each of R1 and R2 independently represents a substituted or unsubstituted alkyl or aryl group having 1 to 8 carbon atoms, while at least one of R1 and R2 has a substituent selected from COOH, PO(OH)$_2$, and Si(OC$_k$H2$_{k+1}$)$_3$, where k represents a numeral in the range of 1 to 20.

In the formula (4), X represents a monovalent anion. The monovalent anion is not limited to a particular ion so long as it forms a stable pair with a cationic part. Specific examples of the monovalent anion include, but are not limited to, Br ion (Br⁻), Cl ion (Cl⁻), ClO$_4$ ion (ClO$_4$), PF$_6$ ion (PF$_6$⁻), and BF$_4$ ion (BF$_4$⁻).

In the formula (4), each of n, m, and l independently represents 0, 1, or 2. In the formula (4), each of A, B, and C independently represents a substituted or unsubstituted alkyl, aryl, or heterocyclic group having 1 to 20 carbon atoms.

The second electrochromic layer may be formed of conducting or semiconducting particles carrying an organic electrochromic compound thereon. More specifically, the conducting or semiconducting fine particles may have a particle diameter of from 5 to 50 nm and may be sintered on a surface of the electrode. The organic electrochromic compound may have a polar group such as phosphonate group, carboxyl group, and silanol group, and may be adsorbed to the surfaces of the conducting or semiconducting fine particles. With this configuration, electrons can be effectively injected into the organic electrochromic compound due to a large surface effect of the fine particles. Thus, the electrochromic device with this configuration can respond more rapidly compared to a conventional electrochromic display device. In addition, since the fine particles can be formed into a transparent display layer, the electrochromic compound can develop color at a much higher density. Furthermore, the conducting or semiconducting fine particles can carry multiple types of organic electrochromic compounds.

Specific preferred materials for the conducting or semiconducting particles include metal oxides, but are not limited thereto. Specific examples of the metal oxides include, but are not limited to, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, and calcium phosphate. Each of these compounds can be used alone or in combination with others.

For electric properties (e.g., electric conductivity) and physical properties (e.g., optical property), titanium oxide, zinc oxide, tin oxide, zirconium oxide, iron oxide, magnesium oxide, indium oxide, and tungsten oxide are preferable.

The shape of the conducting or semiconducting particles is not particularly limited and may be appropriately selected according to the purpose. Preferably, the conducting or semiconducting particles have a shape that has a large surface area per unit volume (hereinafter "specific surface area") for effectively carrying the electrochromic compound. For example, in a case in which the fine particles are composed of an aggregate of nano particles, the fine particles can more effectively carry the electrochromic compound due to their large specific surface area, thus providing an excellent display contrast ratio between coloring and decoloring.

The second electrochromic layer can be formed by vacuum vapor deposition, sputtering, or ion plating. The second electrochromic layer can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

Preferably, the second electrochromic layer has an average thickness of from 0.2 to 5.0 μm. When the average thickness is less than 0.2 μm, coloring density may be insufficient. When the thickness is greater than 5.0 μm, manufacturing cost may increase and visibility may decrease due to the occurrence of coloring.

The electrochromic layer or the layer of the conducting or semiconducting fine particles can be formed by vacuum film deposition or application of a particle dispersion paste. The latter is more preferable in terms of productivity.

Electrolyte

The electrolyte fills the gap between the first electrode and the second electrode.

Examples of the electrolyte include, but are not limited to: inorganic ion salts such as alkali metal salts and alkali-earth metal salts; quaternary ammonium salts; and supporting salts of acids and bases. Specific examples thereof include, but are not limited to, $LiClO_4$, $LiBF_4$, $LiAsF_6$, $LiPF_6$, $LiCF_3SO_3$, $LiCF_3COO$, KCl, $NaClO_3$, NaCl, $NaBF_4$, NaSCN, $KBF_4$, $Mg(ClO_4)_2$, and $Mg(BF_4)_2$.

In addition, ionic liquids can also be used as the electrolyte. In particular, organic ionic liquids are preferable because they have a molecular structure that exhibits liquidity in a wide temperature range including room temperature.

Specific examples of cationic components in such organic ionic liquids include, but are not limited to, imidazole derivatives (e.g., N,N-dimethylimidazole salt, N,N-methylethylimidazole salt, and N,N-methylpropylimidazole salt), pyridinium derivatives (e.g., N,N-dimethylpyridinium salt and N,N-methylpropylpyridinium salt), and aliphatic quaternary ammonium salts (e.g., trimethylpropylammonium salt, trimethylhexylammonium salt, and triethylhexylammonium salt).

Specific preferred examples of anionic components in such organic ionic liquids include, but are not limited to, fluorine-containing compounds such as $BF_4^-$, $CF_3SO_3^-$, and $(CF_3SO_2)_2N^-$, in view of stability in the atmosphere.

Ionic liquids in which the cationic and anionic components are combined are preferably used as the electrolyte.

The ionic liquid may be directly dissolved in a photopolymerizable monomer, an oligomer, or a liquid crystal material. When solubility is poor, the ionic liquid may be first dissolved in a small amount of a solvent, and thereafter mixed with a photopolymerizable monomer, an oligomer, or a liquid crystal material.

The electrolyte need not necessarily be a low-viscosity liquid and may be in the form of a gel, cross-linked polymer, or liquid crystal dispersion. The electrolyte in the form of a gel or solid is advantageous for improving strength and reliability of the device.

Preferably, the electrolyte and the solvent are held in a polymer resin for reliable fixation. Such an electrolyte layer provides high ion conductivity and solid strength.

It is preferable that the polymer resin is a photocurable resin. This is because a photocurable resin can be formed into a thin layer at a lower temperature within a shorter time period compared to a case in which a thin layer is formed by thermal polymerization and/or solvent evaporation.

The average thickness of the electrolyte layer comprising the electrolyte is not particularly limited and may be appropriately selected according to the purpose, but is preferably in the range of from 100 nm to 100 μm.

Solvent

Specific examples of the solvent include, but are not limited to, propylene carbonate, acetonitrile, γ-butyrolactone, ethylene carbonate, sulfolane, dioxolan, tetrahydrofuran, 2-methyltetrahydrofuran, dimethylsulfoxide, 1,2-dimethoxyethane, 1,2-ethoxymethoxyethane, polyethylene glycol, alcohols, and mixed solvents thereof.

Other Components

The electrochromic device may further include an insulating porous layer, a sealing material, or the like.

Insulating Porous Layer

The insulating porous layer has a function of electrically insulating the first electrode and the second electrode from each other and another function of holding the electrolyte.

The material of the insulating porous layer is not particularly limited as long as it is transparent and porous. Preferred examples thereof include an organic material, an inorganic material, and a composite material thereof which has insulating property and durability and excellent film formation property.

The insulating porous layer can be formed by: a sintering method in which polymer fine particles or inorganic particles are partially fused with each other via a binder to form pores between the particles; or an extraction method in which solvent-soluble organic or inorganic substances and solvent-insoluble binders are formed into a layered structure, and the organic or inorganic substances are dissolved with a solvent to form pores.

The insulating porous layer can also be formed by: a foaming method in which a high-molecular-weight polymer is foamed by means of heating or degassing; a phase inversion method in which a mixture of polymers is subjected to phase separation by handling a good solvent and a poor solvent; or a radiation irradiation method in which pores are formed by means of radiation.

The porous insulating layer may be made of, for example, a polymer-mixed particle film containing fine metal oxide particles (e.g., $SiO_2$ particles, $Al_2O_3$ particles) and a polymer binder, a porous organic film (e.g., polyurethane resin film, polyethylene resin film), or a porous inorganic insulating material film. In particular, $SiO_2$ particles are preferable for their high insulating property, relatively low refractive index, and low cost.

The insulating porous layer can be formed by vacuum vapor deposition, sputtering, or ion plating. The insulating porous layer can also be formed by any coating method such as spin coating, casting, micro gravure coating, gravure coating, bar coating, roll coating, wire bar coating, dip coating, slit coating, capillary coating, spray coating, nozzle coating, and various printing methods such as gravure printing, screen printing, flexo printing, offset printing, reverse printing, and inkjet printing.

The average thickness of the insulating porous layer is not particularly limited and may be appropriately selected according to the purpose, but is preferably in the range of from 0.5 to 3 μm.

Sealing Material

The electrochromic device is preferably provided with a sealing material for sealing the side faces of the laminated layers. The sealing material prevents leakage of the electrolyte and intrusion of substances such as moisture and oxygen in the air unnecessary for stable operation of the electrochromic device. The sealing material is not particularly limited. Examples thereof include, but are not limited to, ultraviolet-curable and heat-curable resins such as acrylic resin, urethane resin, and epoxy resin.

EXAMPLES

The embodiments of the present invention are further described in detail with reference to the Examples but is not limited to the following Examples.

Example 1

In the following descriptions, "parts" represent "parts by mass". This example corresponds to the first to third embodiments.

Formation of First Electrochromic Layer

First, an ITO glass substrate (having an area of 40 mm×40 mm, a thickness of 0.7 mm, and an ITO film thickness of about 100 nm) was prepared, in which ITO as a first electrode was formed on a glass substrate as a first substrate. Next, a polyethylene glycol diacrylate (PEG 400DA available from Nippon Kayaku Co., Ltd.), a photo-initiator (IRGACURE 184 available from BASF SE), a compound A represented by the following formula, and 2-butanone were mixed at a mass ratio of 57:3:140:800 to prepare a mixed solution. The above-prepared mixed solution was applied onto the ITO glass substrate by spin coating and cured by ultraviolet rays in a nitrogen atmosphere. Thus, a first electrochromic layer containing the compound A and having a thickness of 1.1 μm was formed on the first electrode.

Compound A

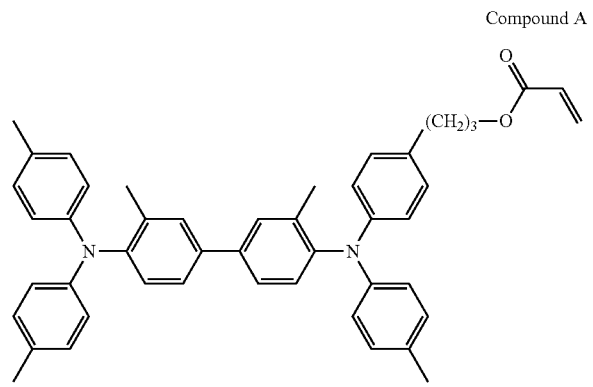

Formation of Insulating Porous Layer

Next, a dispersion liquid of $SiO_2$ fine particles having an average primary particle diameter of 20 nm (containing 24.8% by mass of solid contents of silica, 1.2% by mass of polyvinyl alcohol, and 74% by mass of water) was applied onto the first electrochromic layer by spin coating. Thus, an insulating porous layer was formed. The thickness of the insulating porous layer was about 2 μm.

Formation of Second Electrochromic Layer and Insulating Porous Layer

First, an ITO glass substrate (having an area of 40 mm×40 mm, a thickness of 0.7 mm, and an ITO film thickness of about 100 nm) was prepared, in which ITO as a second electrode was formed on a glass substrate as a second substrate. A titanium oxide nano particle dispersion liquid (SP210 available from Showa Titanium Co., Ltd., having an average particle diameter of about 20 nm) was applied onto the second electrode by spin coating and subjected to an annealing treatment at 120° C. for 15 minutes. Thus, a nanostructural semiconducting material comprising a titanium oxide particle film having a thickness of about 1.0 μm was formed.

Next, a 1% by mass 2,2,3,3-tetrafluoropropanol ("TFP") solution of an electrochromic compound B represented by the following formula was applied onto the titanium oxide particle film by spin coating and subjected to an annealing treatment at 120° C. for 10 minutes. Thus, a second electrochromic layer comprising the titanium oxide particle film and the electrochromic compound B was formed.

Compound B

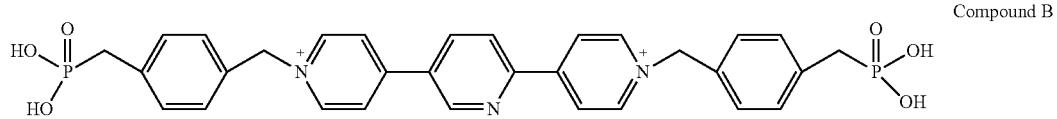

The first substrate and the second substrate thus prepared were bonded so that the electrochromic layers were opposed to each other, and the gap between the substrates was filled with the following electrolytic solution as an electrolyte.

Electrolytic solution: 1-ethyl-3-methylimidazolium bis (trifluoromethylsulfonyl)imide (available from Sigma-Aldrich)

Thus, an electrochromic device was prepared.

Figure 2A:
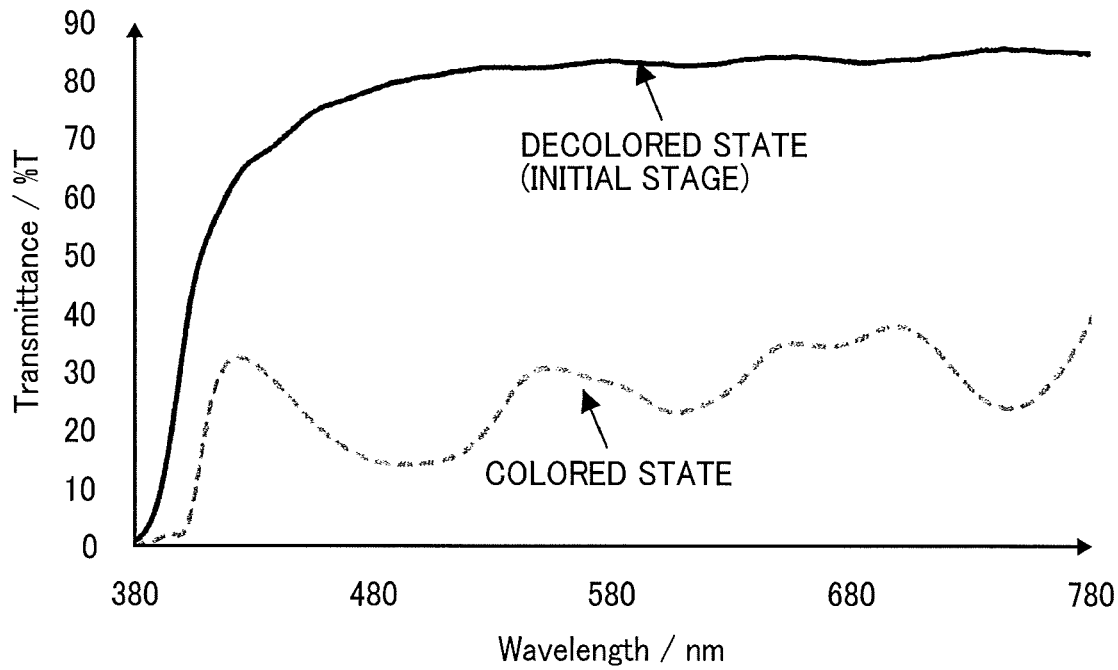
FIG. 2A is a graph showing the transmittance in the visible region of an electrochromic device according to an embodiment of the present invention in a colored state and a decolored state.

Transmittance of the above-prepared electrochromic device was evaluated by the average transmittance in the visible region (from 400 to 800 nm). A transmittance of this electrochromic device in a decolored state was 80% (FIG. 2A).

To confirm an initial coloring/decoloring function, a voltage of −1.6 V with respect to the second electrode was applied to the first electrode for 10 seconds. At that time, the transmittance changed from 80% to 10%. Further, a voltage of +0.5 V with respect to the second electrode was applied to the first electrode for 3 seconds. At that time, the transmittance changed from 10% to 80%.

Figure 2B:
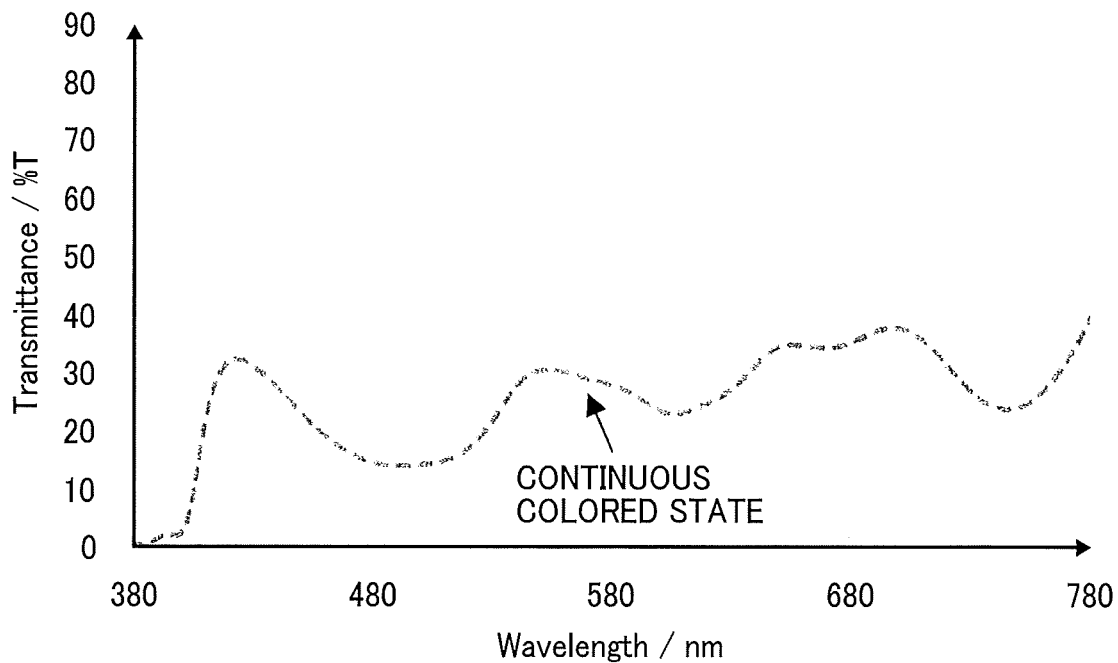
FIG. 2B is a graph showing the transmittance in the visible region of an electrochromic device according to an embodiment of the present invention in a continuous colored state.

The electrochromic device was placed in a thermostatic chamber (at 40° C.) and continuously applied with a voltage of −1.3 V to be in a continuous colored state (FIG. 2B) for 200 hours, and thereafter subjected to decoloring driving. After the decoloring driving, the spectrum in the visible region was observed. As a result, it was confirmed that the transmittance at around 610 nm, derived from the reduction-type electrochromic compound B, did not return to the initial state and insufficient decoloring occurred (FIG. 2C). Therefore, durability and reliability of this electrochromic device was evaluated by the transmittance at 610 nm. Specifically, a "continuous coloring lifetime" was defined as the time when the transmittance measured at a decoloring driving performed after the continuous colored state reached (degraded to) 75% to 80% of the initial transmittance.

The continuous coloring lifetime was measured after the continuous colored state under various temperatures of the thermostatic chamber (25° C., 40° C., 60° C., and 80° C.). The results are as shown in Table 1. The numbers for "continuous coloring lifetime" in Table 1 represent ratios to the continuous coloring lifetime at 25° C.

TABLE 1

| | Temperature of Thermostatic Chamber | | | |
|---|---|---|---|---|
| | 25° C. | 40° C. | 60° C. | 80° C. |
| Continuous Coloring Lifetime | 1.00 | 0.35 | 0.10 | 0.04 |

Next, a thermostatic chamber that raises the temperature from 25° C. to 40° C., a thermostatic chamber that raises the temperature from 25° C. to 60° C., and a thermostatic chamber that raises the temperature from 25° C. to 80° C. were prepared. The electrochromic device was put into a continuous colored state in each thermostatic chamber. The temperature was raised at a rate of 5° C./min and maintained for 55 minutes after the increment of 5° C., in other words, the temperature was raised by 5° C. stepwise.

In Example 1, the coloring limiting temperature was set to 40° C. based on the results shown in Table 1 (the coloring limiting temperature can be arbitrarily set according to the product specifications). Therefore, in the thermostatic chamber that raises the temperature from 25° C. to 60° C. and in the thermostatic chamber that raises the temperature from 25° C. to 80° C., a forcible decoloring driving was performed when the temperature reached 40° C. or higher to put the electrochromic device into a decolored state. As a result, the ratio in terms of transmittance after the decoloring driving of each of the electrochromic device placed in the thermostatic chamber that raises the temperature from 25° C. to 60° C. and the electrochromic device placed in the thermostatic chamber that raises the temperature from 25° C. to 80° C. to the electrochromic device placed in the thermostatic chamber that raises the temperature from 25° C. to 40° C. were 0.98 and 0.97, respectively. It was confirmed that durability and reliability were ensured by putting the electrochromic device in a decolored state even when the temperature was raised to 40° C. or higher.

Generally, as with secondary batteries that are of the same electrochemical devices, properties of electrochromic devices largely change depending on the material, formulation, and manufacturing process. In the present disclosure, the electrochromic device is able to take measures against any type of deterioration mode, not limited to the above-described types of deterioration mode. It is preferable that an evaluation is performed based on an index set according to the deterioration mode.

Comparative Example 1

An electrochromic device was prepared in the same manner as in Example 1, and placed in each of a thermostatic chamber kept at 40° C., a thermostatic chamber kept at 60° C., and a thermostatic chamber kept at 80° C. In each thermostatic chamber, a forcible decoloring driving was not performed and the continuous colored state was maintained for 50 hours.

After completion of the test, all the electrochromic devices were subjected to a decoloring driving and the transmittance at 610 nm was evaluated. As a result, the transmittance of the electrochromic device placed in the thermostatic chamber kept at 40° C. was 78%, while those placed in the thermostatic chambers kept at 60° C. and at 80° C. were 72% and 65%, respectively, which remarkably decreased durability and reliability.

Example 2

This example corresponds to the control f3 in the first, second, and third embodiments.

An electrochromic device was prepared in the same manner as in Example 1.

The coloring limiting temperature was set to 40° C. as in Example 1. The electrochromic device was further provided with a control circuit for limiting ("inhibiting" in the present example) transition to a colored state, even when a button for coloring is pressed when the electrochromic device is in a decolored state, when the operating environment temperature of the electrochromic device exceeds the coloring limiting temperature of 40° C.

The electrochromic device was placed in each of the thermostatic chamber kept at 40° C., the thermostatic chamber kept at 60° C., and the thermostatic chamber kept at 80° C., without being put into a colored state. After confirming that the temperature had reached a predetermined temperature, the button for coloring was turned on.

As a result, it was confirmed that the electrochromic device placed in the thermostatic chamber kept at 40° C. transited to a colored state but those placed in the respective thermostatic chambers kept at 60° C. and at 80° C. did not transit to a colored state.

In the thermostatic chamber kept at 40° C., the electrochromic device maintained in a continuous colored state for 20 hours. In each of the thermostatic chambers kept at 60° C. and at 80° C., the electrochromic device was allowed to stand in a decolored state (with the button for coloring turned on) for 20 hours.

Subsequently, the electrochromic device placed in the thermostatic chamber kept at 40° C. was returned to a decolored state. All the electrochromic devices including the electrochromic devices left in the respective thermostatic chambers kept at 60° C. and at 80° C. were placed in the thermostatic chamber kept at 40° C. and put into a continuous colored state for 20 hours. Subsequently, all the electrochromic devices were returned to a decolored state and the transmittance at 610 nm was evaluated. As a result, the transmittance of the electrochromic device in a continuous colored state in the thermostatic chamber kept at 40° C. was 77%, that of the electrochromic device inhibited from transiting to a colored state in the thermostatic chamber kept at 60° C. was 78%, and that of the electrochromic device inhibited from transiting to a colored state in the thermostatic chamber kept at 80° C. was 77%.

It is clear from these results that durability and reliability of the electrochromic device is ensured when the coloring limiting temperature is appropriately set and transition to a colored state is limited ("inhibited" in the present example), even when a button for coloring is pressed when the electrochromic device is in a decolored state, when the operation environment temperature of the electrochromic device exceeds the coloring limiting temperature.

Example 3

This example corresponds to the control f6 in the fourth embodiment.

An electrochromic device was prepared in the same manner as in Example 1.

In Example 1, the coloring limiting temperature was set regardless of coloring density, however, in Example 3, the coloring limiting temperature was set according to coloring density. Specifically, when the transmittance in a colored state was 10%, 20%, and 40%, the coloring limiting temperature was set to 40° C., 45° C., and 50° C., respectively. Deterioration state was evaluated for each transmittance in a colored state. The results were as described in the following (1) to (3).

(1) When the transmittance in a colored state was continuously maintained at 10%, in the thermostatic chamber that raises the temperature from 25° C. to 60° C. and the thermostatic chamber that raises the temperature from 25° C. to 80° C., a forcible decoloring driving was performed when the temperature reached 40° C. or higher to put the electrochromic device in a decolored state. As a result, the ratio in terms of transmittance after the decoloring driving of each of the electrochromic device placed in the thermostatic chamber that raises the temperature from 25° C. to 60° C. and the electrochromic device placed in the thermostatic chamber that raises the temperature from 25° C. to 80° C. to the electrochromic device placed in the thermostatic chamber that raises the temperature from 25° C. to 40° C. were 0.98 and 0.97, respectively. It was confirmed that durability and reliability were ensured by putting the electrochromic device in a decolored state even when the temperature was raised to 40° C. or higher.

(2) When the transmittance in a colored state was continuously maintained at 20%, in the thermostatic chamber that raises the temperature from 25° C. to 60° C. and the thermostatic chamber that raises the temperature from 25° C. to 80° C., a forcible decoloring driving was performed when the temperature reached 45° C. or higher to put the electrochromic device in a decolored state. As a result, the ratio in terms of transmittance after the decoloring driving of each of the electrochromic device placed in the thermostatic chamber that raises the temperature from 25° C. to 60° C. and the electrochromic device placed in the thermostatic chamber that raises the temperature from 25° C. to 80° C. to the electrochromic device placed in the thermostatic chamber that raises the temperature from 25° C. to 40° C. were 0.97 and 0.97, respectively. It was confirmed that durability and reliability were ensured by putting the electrochromic device in a decolored state even when the temperature was raised to 45° C. or higher.

(3) When the transmittance in a colored state was continuously maintained at 40%, in the thermostatic chamber that raises the temperature from 25° C. to 60° C. and the thermostatic chamber that raises the temperature from 25° C. to 80° C., a forcible decoloring driving was performed when the temperature reached 50° C. or higher to put the electrochromic device in a decolored state. As a result, the ratio in terms of transmittance after the decoloring driving of each of the electrochromic device placed in the thermostatic chamber that raises the temperature from 25° C. to 60° C. and the electrochromic device placed in the thermostatic chamber that raises the temperature from 25° C. to 80° C. to the electrochromic device placed in the thermostatic chamber that raises the temperature from 25° C. to 40° C. were 0.97 and 0.96, respectively. It was confirmed that durability and reliability were ensured by putting the electrochromic device in a decolored state even when the temperature was raised to 50° C. or higher.

Comparative Example 2

An electrochromic device was prepared in the same manner as in Example 3, and placed in each of a thermostatic chamber kept at 40° C., a thermostatic chamber kept at 60° C., and a thermostatic chamber kept at 80° C. Regardless of the set transmittance, a forcible decoloring driving was not performed and the continuous colored state was maintained for 50 hours.

After completion of the test, all the electrochromic devices were subjected to a decoloring driving and the transmittance at 610 nm was evaluated. As a result, durability and reliability remarkably decreased as described in the following (1) to (3).

(1) When the transmittance in a colored state was continuously maintained at 10%, the transmittance of the electrochromic device placed in the thermostatic chamber kept at 40° C. was 78%, while those placed in the thermostatic chambers kept at 60° C. and at 80° C. were 73% and 65%, respectively.

(2) When the transmittance in a colored state was continuously maintained at 20%, the transmittance of the electrochromic device placed in the thermostatic chamber kept at 40° C. was 78%, while those placed in the thermostatic chambers kept at 60° C. and at 80° C. were 75% and 70%, respectively.

(3) When the transmittance in a colored state was continuously maintained at 40%, the transmittance of the electrochromic device placed in the thermostatic chamber kept at 40° C. was 78%, while those placed in the thermostatic chambers kept at 60° C. and at 80° C. were 75% and 70%, respectively.

Example 4

This example corresponds to the fifth embodiment.

An electrochromic device was prepared in the same manner as in Example 1.

The upper limit time period allowing the continuous colored state was set to 50 hours. A control circuit for forcibly transiting to a decolored state when the time period of the continuous colored state exceeded 50 hours was provided by a general timer circuit.

The electrochromic device was placed in each of a thermostatic chamber kept at 30° C., a thermostatic chamber kept at 40° C., and a thermostatic chamber kept at 50° C., and allowed to stand in a continuous colored state. As a result, all the electrochromic devices transited to a decolored state after a time period of 50 hours.

At this time, the transmittance at 610 nm was evaluated. As a result, the transmittance was maintained at 75% or higher in all the samples.

On the other hand, in the electrochromic device which was allowed to stand in the thermostatic chamber kept at 50° C. for 150 hours and thereafter subjected to a decoloring driving, the transmittance at 610 nm was reduced to 70% or lower.

It is clear from these results that durability and reliability of the electrochromic device is ensured when the upper limit time period allowing the continuous colored state is appropriately set and transition to a decolored state is forcibly performed when the time period of the continuous colored state exceeds the upper limit time period.

Example 5

This example corresponds to the sixth embodiment.

An electrochromic device was prepared in the same manner as in Example 4.

The procedure in Example 4 was repeated except that an intermittent driving with a cycle of applying a voltage for 10 minutes and a pause for 5 minutes was performed with maintaining the continuous colored state in place of continuous voltage application and that the upper limit of the number of times of application of electricity (voltage) was used in place of the upper limit time period allowing the continuous colored state.

The upper limit of the number of times of application of voltage was set to 200 times. It was confirmed that, since the electrochromic device has a memory property, a colored state was maintained as long as the electrochromic device was kept in an open state even when application of electricity was stopped. Specifically, the change in transmittance (change to a decolored state) after application of voltage for 10 minutes and a pause for 5 minutes was within 3%.

The electrochromic device was placed in each of a thermostatic chamber kept at 30° C., a thermostatic chamber kept at 40° C., and a thermostatic chamber kept at 50° C., and allowed to stand in a continuous colored state. As a result, all the electrochromic devices transited to a decolored state after 200 times of application of electricity. At this time, the transmittance at 610 nm was evaluated. As a result, the transmittance was maintained at 76% or higher in all the samples.

On the other hand, in the electrochromic device which was applied with a voltage 700 times in the thermostatic chamber kept at 50° C. and thereafter subjected to a decoloring driving, the transmittance at 610 nm was reduced to 70% or lower.

It is clear from these results that durability and reliability of the electrochromic device is ensured when the upper limit of the number of times of application of electricity (voltage) is appropriately set and transition to a decolored state is forcibly performed when the number of times of application of electricity for maintaining the continuous colored state exceeds the upper limit.

Example 6

This example corresponds to the seventh embodiment.

An electrochromic device was prepared in the same manner as in Example 4.

The upper limit time period allowing the continuous colored state was set for each temperature. A control circuit was provided for forcibly transiting to a decolored state when the time period of the continuous colored state exceeds the upper limit time period allowing the continuous colored state set for each temperature as shown in Table 2.

TABLE 2

|  | Temperature of Thermostatic Chamber | | | |
| --- | --- | --- | --- | --- |
|  | 25° C. | 40° C. | 60° C. | 80° C. |
| Upper Limit Time Period Allowing Continuous Colored State (hr) | 400 | 150 | 40 | 10 |

The electrochromic device was placed in each of a thermostatic chamber kept at 25° C., a thermostatic chamber kept at 40° C., a thermostatic chamber kept at 60° C., and a thermostatic chamber kept at 80° C., and allowed to stand in a continuous colored state. As a result, all the electrochromic devices transited to a decolored state after a period of time shown in Table 2.

At this time, the transmittance at 610 nm was evaluated. As a result, the transmittance was maintained at 75% or higher in all the samples.

On the other hand, in the electrochromic device which was allowed to stand in a colored state in each of the thermostatic chamber kept at 25° C., the thermostatic chamber kept at 40° C., the thermostatic chamber kept at 60° C., and the thermostatic chamber kept at 80° C. for 1.5 times the upper limit time period shown in Table 2 and thereafter subjected to a decoloring driving, the transmittance at 610 nm was reduced to 70% or lower.

It is clear from these results that durability and reliability of the electrochromic device is ensured when the upper limit time period allowing the continuous colored state is appropriately set according to each temperature and transition to a decolored state is performed when the time period of the continuous colored state exceeds the upper limit time period.

Example 7

This example corresponds to the ninth embodiment.

An electrochromic device was prepared in the same manner as in Example 6.

The upper limit time period allowing the continuous colored state was set for each combination of temperature and illuminance. A control circuit was provided for transiting to a decolored state when the time period of the continuous colored state exceeds the upper limit time period allowing the continuous colored state set for each combination of temperature and illuminance as shown in Table 3.

The electrochromic device in a colored state exhibiting a transmittance of about 20% was irradiated with light having an illuminance of 66,000 lux emitted from a simulated solar light source SUNTEST CP+. At this time, the outermost surface of the electrochromic device was coated with an ultraviolet cut layer for cutting ultraviolet rays having a wavelength of about 400 nm or less.

TABLE 3

|  |  | 25° C. | 40° C. | 60° C. | 80° C. |
| --- | --- | --- | --- | --- | --- |
| Illuminance 0 (lux) | Upper Limit Time Period Allowing Continuous Colored State (hr) | 400 | 150 | 40 | 10 |
| Illuminance 66,000 (lux) |  | 100 | 37 | 10 | 2 |

The electrochromic device was placed in each of a thermostatic chamber kept at 25° C., a thermostatic chamber kept at 40° C., a thermostatic chamber kept at 60° C., and a thermostatic chamber kept at 80° C., and allowed to stand in a continuous colored state under continuous irradiation with simulated solar light having an illuminance of 66,000 lux. As a result, all the electrochromic devices transited to a decolored state after a period of time shown in the lower column of Table 3.

At this time, the transmittance at 610 nm was evaluated. As a result, the transmittance was maintained at 75% or higher in all the samples.

On the other hand, in the electrochromic device which was allowed to stand in a colored state in each of the thermostatic chamber kept at 25° C., the thermostatic chamber kept at 40° C., the thermostatic chamber kept at 60° C., and the thermostatic chamber kept at 80° C. for 1.5 times the upper limit time period shown in the lower column of Table 3 under irradiation with simulated solar light for 1.5 times the irradiation time period and thereafter subjected to a decoloring driving, the transmittance at 610 nm was reduced to 65% or lower.

The effect when the illuminance is 0 lux is as shown in Example 6.

It is clear from these results that durability and reliability of the electrochromic device is ensured when the upper limit time period allowing the continuous colored state is appropriately set according to each combination of temperature and illuminance and transition to a decolored state is performed when the time period of the continuous colored state exceeds the upper limit time period.

Example 8

This example corresponds to the fourteenth and seventeenth embodiments.

Figure 3:
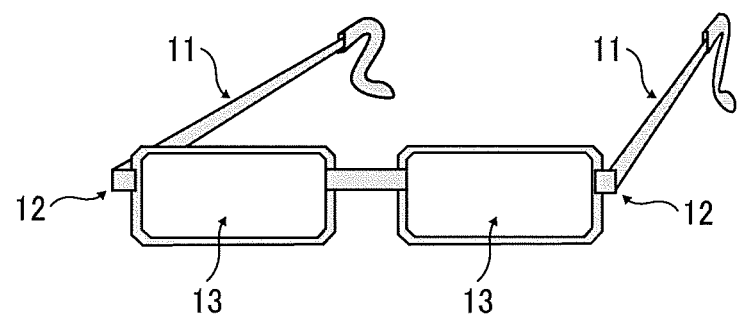
FIG. 3 is a schematic diagram of electronic dimming eyeglasses according to an embodiment of the present invention.

An electrochromic device was prepared in the same manner as in Example 1 except that a resin lens was used as the substrate. The electrochromic device was attached to a lens to prepare a light control lens 13. The light control lens 13 was incorporated in an eyeglass frame, thus preparing electronic dimming eyeglasses (FIG. 3). On the eyeglass frame, a drive power source, a signal control circuit, a switch, and wiring were mounted.

Next, a magnetic sensor was mounted in the vicinity of a folding portion 12 for detecting folding of a temple 11 at the folded portion 12. In addition, a control circuit for putting the electrochromic device into a decolored state when the temple was folded was mounted.

After confirming the basic operation of decreasing the transmittance of the lens when the switch for coloring is tuned on and increasing the transmittance of the lens when the switch for decoloring is tuned on, the electronic dimming eyeglasses were put on a person.

When the switch for coloring was tuned on while the electronic dimming eyeglasses were put on the person, the eyeglasses were thereafter removed from the person while remaining in a colored state, and the temples were folded, it was confirmed that the magnetic sensor immediately started working and the eyeglasses automatically transited to a decolored state.

In this example, the electrochromic device is incorporated in electronic dimming eyeglasses. It is needless to say that the same effect can be obtained when the electrochromic device is incorporated in augmented reality eyeglasses for the similarity in structure.

Example 9

This example corresponds to the fourteenth and eighteenth embodiments.

Electronic dimming eyeglasses using an electrochromic device were prepared in the same manner as in Example 8.

In this example, an acceleration sensor was mounted on the temple in place of the magnetic sensor in the eighth embodiment, and a control circuit for putting the electrochromic device in a decolored state when the output from the acceleration sensor falls below a certain value during a certain time period was mounted.

After confirming the basic operation of decreasing the transmittance of the lens when the switch for coloring is tuned on and increasing the transmittance of the lens when the switch for decoloring is tuned on, the electronic dimming eyeglasses were put on a person.

When the switch for coloring was tuned on while the electronic dimming eyeglasses were put on the person and the eyeglasses were thereafter removed from the person while remaining in a colored state and left on a table without the temples folded, it was confirmed that the eyeglasses automatically transited to a decolored state after a time period of about 30 seconds.

In this example, the electrochromic device is incorporated in electronic dimming eyeglasses. It is needless to say that the same effect can be obtained when the electrochromic device is incorporated in augmented reality eyeglasses for the similarity in structure.

Example 10

This example corresponds to the second and fourteenth embodiments.

Electronic dimming eyeglasses using an electrochromic device were prepared in the same manner as in Example 8.

Figure 4:
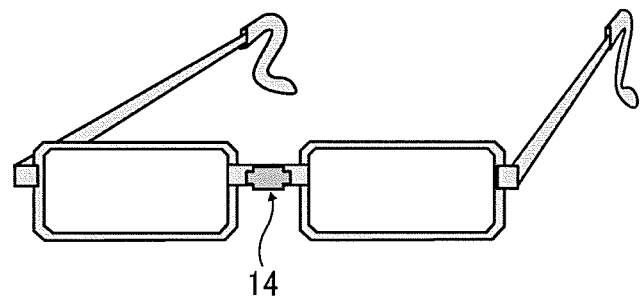
FIG. 4 is a schematic diagram of electronic dimming eyeglasses according to an embodiment of the present invention.

As illustrated in FIG. 4, a commercially available illuminance sensor 14 was further provided on the bridge portion for sensing the illuminance around the electrochromic device, and a control circuit for putting the electrochromic device in a decolored state when exposed to sunlight equivalent to light having an illuminance of 100,000 lux was mounted.

Furthermore, a commercially available temperature sensor was provided on the bridge portion, and a control circuit for putting the electrochromic device in a decolored state when the temperature reached 50° C. or higher was mounted.

When the switch for coloring was tuned on and the electronic dimming eyeglasses were exposed to simulated solar light having an illuminance of 100,000 lux while remaining in a colored state, it was confirmed that the eyeglasses automatically transited to a decolored state after a time period of about 10 seconds.

In addition, it was confirmed that when the electronic dimming eyeglasses were placed in a thermostatic chamber and the temperature was raised from 25° C. to 55° C., it was confirmed that the eyeglasses automatically transited to a decolored state when the temperature exceeded around 50° C.

In this example, the electrochromic device is incorporated in electronic dimming eyeglasses. It is needless to say that the same effect can be obtained when the electrochromic device is incorporated in augmented reality eyeglasses for the similarity in structure.

Example 11

This example corresponds to the sixteenth and twentieth embodiments.

An electrochromic device was prepared in the same manner as in Example 1.

This electrochromic device was mounted as an ND filter on the front side of a commercially available lens for a single-lens reflex camera. On the camera body, a drive power source, a signal control circuit, a switch, and wiring were mounted.

In addition, a control circuit for putting the electrochromic device in a decolored state when the main power supply of the camera was off was mounted.

After confirming the basic operation of decreasing the transmittance of the ND filter when the switch for coloring is tuned on and increasing the transmittance of the ND filter when the switch for decoloring is tuned on and repeating this basic operation, it was confirmed that the ND filter immediately transited to a decolored state after the main power supply of the camera body was tuned off.

In this example, the electrochromic device is incorporated in a single-lens reflex camera. It is needless to say that the same effect can be obtained when the electrochromic device is incorporated in a video camera for the similarity in structure.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An electrochromic device reversibly and controllably colored and decolored by electricity, configured to control at least one of the following functions f1 and f2 based on at least one of a measured operating environment temperature of the electrochromic device, a measured continuous elapsed time of a colored state or a decolored state, and a measured illuminance around the electrochromic device:
   a function f1 of transiting to a colored state and/or limiting transition to a decolored state; and
   a function f2 of transiting to a decolored state and/or limiting transition to a colored state.

2. An electrochromic device reversibly and controllably colored and decolored by electricity, the electrochromic device comprising:
   at least one of an oxidation-type electrochromic material colorable upon oxidation by application of electricity and a reduction-type electrochromic material colorable upon reduction by application of electricity; and
   a temperature sensor configured to acquire an operating environment temperature of the electrochromic device;
   wherein the electrochromic device has at least one of the following functions, which are performed in dependence on the operating temperature acquired by the temperature sensor;
     a function of transiting from a colored state to another colored state closer to a decolored state;
     a function of transiting from a colored state to a decolored state;
     a function of limiting transition from a decolored state to a colored state; and
     a function of inhibiting transition from a decolored state to a maximum colored state.

3. The electrochromic device of claim 2, further comprising:
   a memory configured to store a coloring limiting temperature,
   wherein the electrochromic device performs at least one of the following controls f3 and f4 based on conditions in a colored state or a decolored state;
     a control f3, when in a decolored state, of limiting transition from the decolored state to a colored state when the operating environment temperature is higher than the coloring limiting temperature; and
     a control f4, when in a colored state, of transiting from the colored state to a decolored state when the operating environment temperature is higher than the coloring limiting temperature.

4. The electrochromic device of claim 2, further comprising:
   a memory configured to store a coloring limiting temperature according to coloring density,
   wherein the electrochromic device performs at least one of the following controls f5 and f6 based on conditions in a colored state or a decolored state:
     a control f5, when in a decolored state, of limiting transition to a coloring density at which the operating environment temperature is higher than the coloring limiting temperature; and
     a control f6, when in a colored state and the operating environment temperature is higher than the coloring limiting temperature, of transiting to a coloring density at which the operating environment temperature is not higher than the coloring limiting temperature.

5. An electrochromic device reversibly and controllably colored and decolored by electricity, the electrochromic device comprising:
   at least one of an oxidation-type electrochromic material colorable upon oxidation by application of electricity and a reduction-type electrochromic material colorable upon reduction by application of electricity,
   wherein the electrochromic device has at least one of the following functions:
     a function of transiting from a colored state to another colored state closer to a decolored state;
     a function of transiting from a colored state to a decolored state;
     a function of limiting transition from a decolored state to a colored state; and
     a function of inhibiting transition from a decolored state to a maximum colored state;
   wherein the electrochromic device is driven by continuous or intermittent application of electricity to maintain a colored state displaying a certain coloring density;
   the electrochromic device further includes
     a measuring device configured to measure a time period of a continuous colored state; and
     a memory configured to store an upper limit time period allowing the continuous colored state regardless of coloring density; and
   wherein the electrochromic device transits from the colored state to a decolored state or to another colored state closer to the decolored state, when the time period of the continuous colored state exceeds the upper limit time period allowing the continuous colored state.

6. An electrochromic device reversibly and controllably colored and decolored by electricity, the electrochromic device comprising:
   at least one of an oxidation-type electrochromic material colorable upon oxidation by application of electricity and a reduction-type electrochromic material colorable upon reduction by application of electricity,
   wherein the electrochromic device has at least one of the following functions:
     a function of transiting from a colored state to another colored state closer to a decolored state;
     a function of transiting from a colored state to a decolored state;
     a function of limiting transition from a decolored state to a colored state; and
     a function of inhibiting transition from a decolored state to a maximum colored state;

wherein the electrochromic device is driven by continuous or intermittent application of electricity to maintain a colored state displaying a certain coloring density;

the electrochromic device further includes
a measuring device configured to measure a number of times of application of electricity for maintaining a continuous colored state; and
a memory configured to store an upper limit of the number of times of application of electricity allowing the continuous colored state; and wherein the electrochromic device transits from the colored state to a decolored state or to another colored state closer to the decolored state, when the number of times of application of electricity for maintaining the continuous colored state exceeds the upper limit of the number of times of application of electricity allowing the continuous colored state.

7. The electrochromic device of claim 2, driven by continuous or intermittent application of electricity to maintain a colored state displaying a certain coloring density, further comprising:
a measuring device configured to measure a time period of a continuous colored state; and
a memory configured to store an upper limit time period allowing the continuous colored state for each operating environment temperature,
wherein the electrochromic device transits from a colored state to a decolored state or to another colored state closer to the decolored state, when the time period of the continuous colored state exceeds the upper limit time period allowing the continuous colored state according to the operating environment temperature.

8. The electrochromic device of claim 2, driven by continuous or intermittent application of electricity to maintain a colored state displaying a certain coloring density, further comprising:
a measuring device configured to measure a number of times of application of electricity for maintaining a continuous colored state; and
a memory configured to store an upper limit of the number of times of application of electricity allowing the continuous colored state for each operating environment temperature,
wherein the electrochromic device transits from a colored state to a decolored state or to another colored state closer to the decolored state, when the number of times of application of electricity for maintaining the continuous colored state exceeds the upper limit of the number of times of application of electricity allowing the continuous colored state according to the operating environment temperature.

9. The electrochromic device of claim 2, driven by continuous or intermittent application of electricity to maintain a colored state displaying a certain coloring density, further comprising:
an illuminance sensor configured to acquire an illuminance around the electrochromic device;
a measuring device configured to measure a time period of a continuous colored state; and
a memory configured to store an upper limit time period allowing the continuous colored state for each combination of the operating environment temperature and the illuminance,
wherein the electrochromic device transits from a colored state to a decolored state or to another colored state closer to the decolored state, when the time period of the continuous colored state exceeds the upper limit time period allowing the continuous colored state according to the combination of the operating environment temperature and the illuminance.

10. The electrochromic device of claim 2, driven by continuous or intermittent application of electricity to maintain a colored state displaying a certain coloring density, further comprising:
an illuminance sensor configured to acquire an illuminance around the electrochromic device;
a measuring device configured to measure a number of times of application of electricity for maintaining a continuous colored state; and
a memory configured to store an upper limit of the number of times of application of electricity allowing the continuous colored state for each combination of the operating environment temperature and the illuminance,
wherein the electrochromic device transits from a colored state to a decolored state or to another colored state closer to the decolored state, when the number of times of application of electricity for maintaining the continuous colored state exceeds the upper limit of the number of times of application of electricity allowing the continuous colored state according to the combination of the operating environment temperature and the illuminance.

11. The electrochromic device of claim 2, further comprising:
a first substrate and a second substrate opposed with a gap therebetween, at least one of the first substrate and the second substrate being transparent;
a first electrode and a second electrode opposed with the first substrate and the second substrate, respectively, at least one of the first electrode and the second electrode being transparent;
a first electrochromic layer on a surface of the first electrode which faces the second electrode, the first electrochromic layer containing at least one of an oxidation-type electrochromic compound and an oxidation-type electrochromic composition;
a second electrochromic layer on a surface of the second electrode which faces the first electrode, the second electrochromic layer containing at least one of a reduction-type electrochromic compound and a reduction-type electrochromic composition; and
an electrolyte between the first electrode and the second electrode.

12. The electrochromic device of claim 11, wherein the first electrochromic layer comprises a cross-linked product of an electrochromic composition containing a triarylamine-containing radical polymerizable compound and another radical polymerizable compound different from the triarylamine-containing radical polymerizable compound.

13. The electrochromic device of claim 11, wherein the second electrochromic layer contains semiconducting metal oxide particles.

14. Electronic dimming eyeglasses, comprising:
a lens comprising the electrochromic device of claim 2.

15. Augmented reality eyeglasses, comprising:
a light shielding filter comprising the electrochromic device of claim 2.

16. A camera, comprising:
a neutral density filter comprising the electrochromic device of claim 2.

17. The electronic dimming eyeglasses of claim 14, further comprising a temple, wherein, when the temple is folded, the lens transits to a decolored state instantaneously or after a certain time period of time.

18. The electronic dimming eyeglasses of claim 14, further comprising a sensor configured to detect a wearing condition of the electronic dimming eyeglasses, wherein, when the sensor detects an abnormal wearing condition, the lens transits to a decolored state instantaneously or after a certain time period of time.

19. The augmented reality eyeglasses of claim 15, further comprising a sensor configured to detect a wearing condition of the augmented reality eyeglasses, wherein, when the sensor detects an abnormal wearing condition, the light shielding filter transits to a decolored state instantaneously or after a certain time period of time.

20. The camera of claim 16, wherein, when the camera ends operating, the neutral density filter transits to a decolored state instantaneously or after a certain time period of time.

* * * * *